(12) United States Patent
Mintgen et al.

(10) Patent No.: US 6,179,100 B1
(45) Date of Patent: Jan. 30, 2001

(54) BLOCKABLE PISTON-CYLINDER UNIT

(75) Inventors: Rolf Mintgen, Thür; Wolfgang Rothe, Windhagen; Dirk Rennecke, Andernach; Andreas Ritter, Hilgert; Marco Gehlen, Niederstadtfeld, all of (DE)

(73) Assignee: Stabilus GmbH, Koblenz (DE)

( * ) Notice: Under 35 U.S.C. 154(b), the term of this patent shall be extended for 0 days.

(21) Appl. No.: 09/124,443

(22) Filed: Jul. 29, 1998

(30) Foreign Application Priority Data

Jul. 29, 1997 (DE) .............................................. 197 32 452
Aug. 11, 1997 (DE) .............................................. 197 34 466
May 7, 1998 (DE) .............................................. 198 20 404

(51) Int. Cl.$^7$ ....................................................... F16F 9/34
(52) U.S. Cl. ................................ 188/282.1; 188/322.15; 267/64.15
(58) Field of Search ........................... 188/282.1, 322.22, 188/322.13, 322.15, 300, 276, 281, 282.7, 282.8, 284; 267/64.11, 64.13, 64.15, 124, 126, 127, 128, 129

(56) References Cited

U.S. PATENT DOCUMENTS

| | | | |
|---|---|---|---|
| 2,369,007 | * 2/1945 | Beecher | ................ 188/281 |
| 4,401,196 | 8/1983 | Grundei . | |
| 5,137,125 | * 8/1992 | Troltsch et al. | ................ 188/322.15 |
| 5,450,933 | 9/1995 | Schüttler . | |
| 5,560,456 | 10/1996 | Koch et al. | ............ 188/300 |
| 5,862,893 | * 1/1999 | Volpel | .................... 188/300 |

FOREIGN PATENT DOCUMENTS

| | | |
|---|---|---|
| 43 26 968 | 9/1994 | (DE) . |
| 44 31 626 | 5/1995 | (DE) . |
| 2 195 704 | 4/1988 | (GB) . |
| WO83/03648 | 10/1983 | (WO) . |

\* cited by examiner

*Primary Examiner*—Robert J. Oberleitner
*Assistant Examiner*—Thomas J. Williams
(74) *Attorney, Agent, or Firm*—Baker Botts L.L.P.

(57) ABSTRACT

A piston-cylinder unit, comprising a cylinder which is subdivided by a piston on a piston rod into two working chambers. Between the two working chambers, there is a fluid connection which can be blocked by means of a valve arrangement having at least two individual closing valves arranged in series, each with a valve inflow side and a valve outflow side. The valves open sequentially. In the flow path between the individual valves, there is a throttle arrangement which produces a pressure reduction between the valve outflow side of the first closing valve towards the valve inflow side of the following closing valve. As the opening of the first closing valve increases, the effect of the throttle arrangement decreases; to the same extent, the pressurization increases on the valve inflow side of the following closing valve. The valve arrangement features two flow-through directions and is made so that each can be blocked.

33 Claims, 17 Drawing Sheets

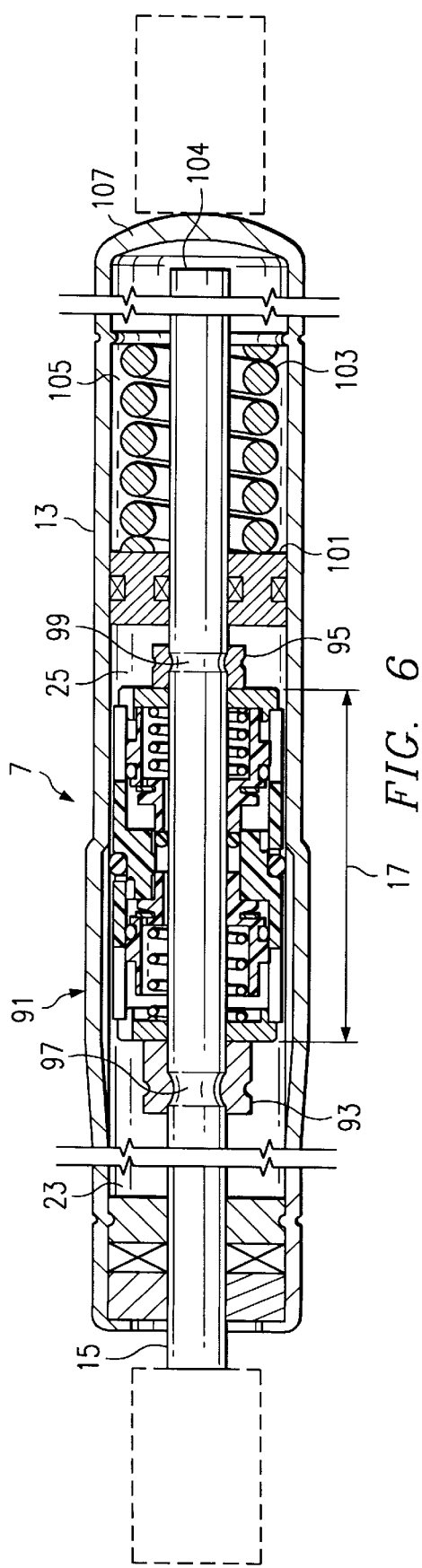
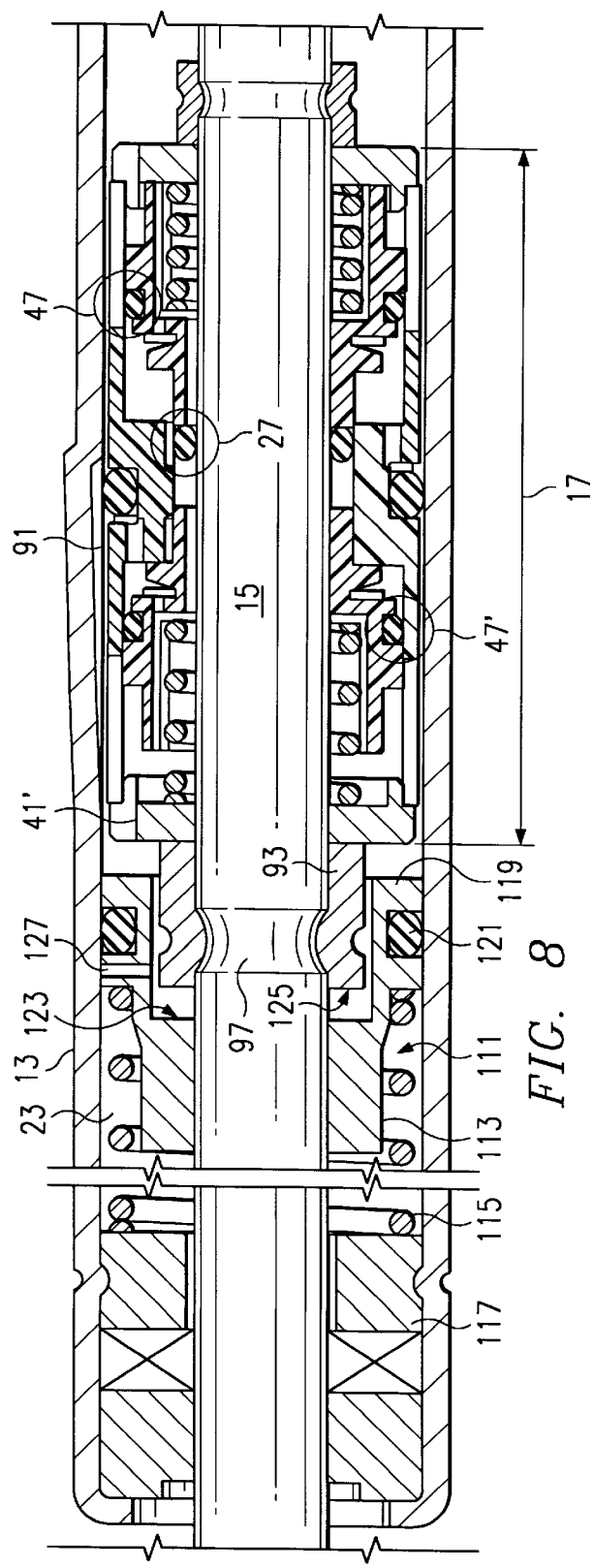
FIG. 6
FIG. 8

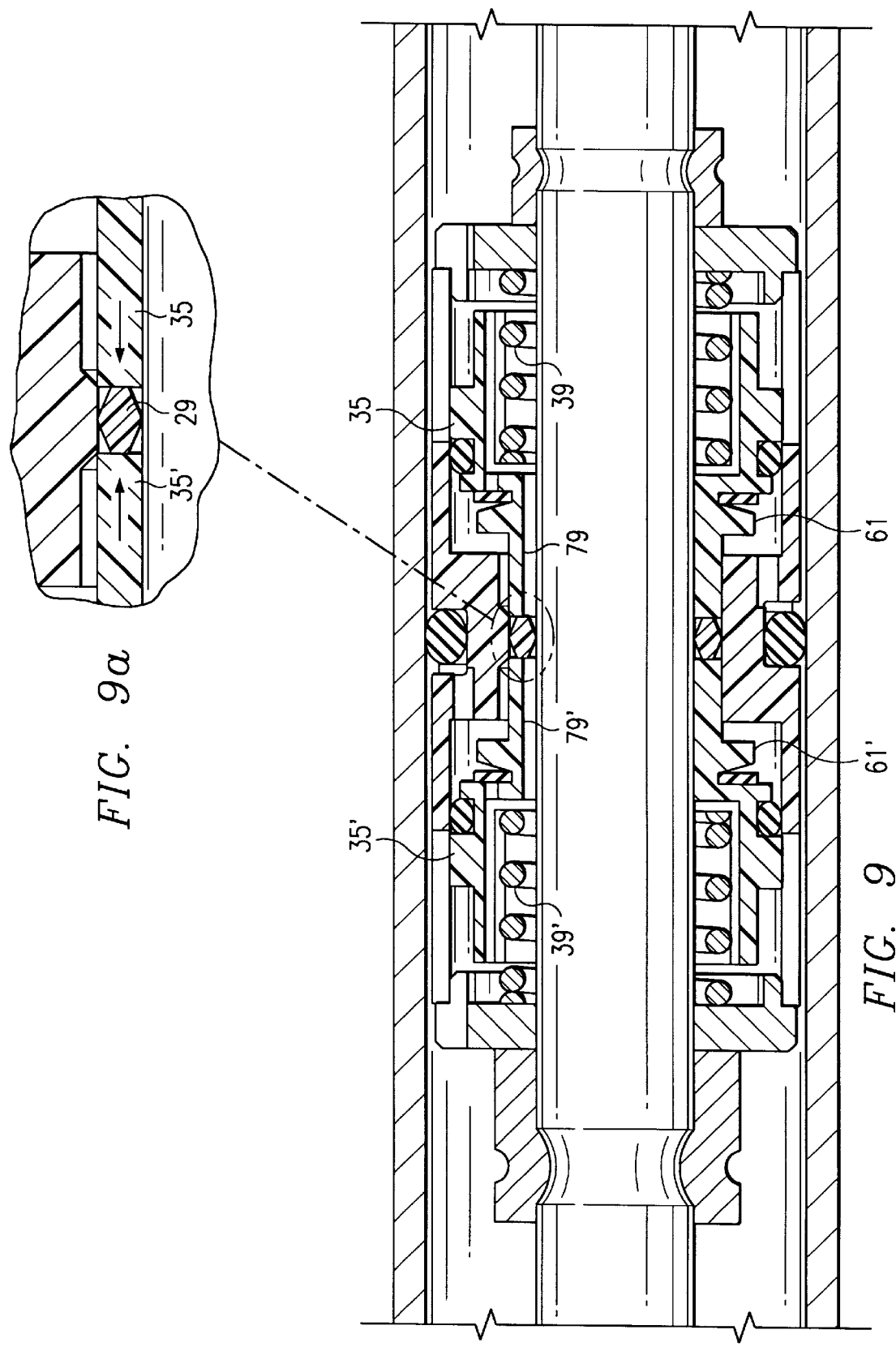

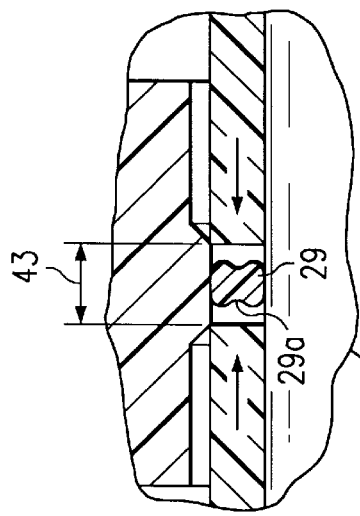
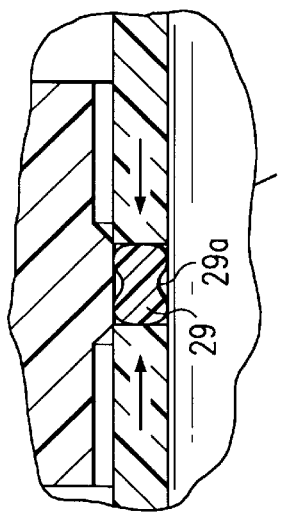
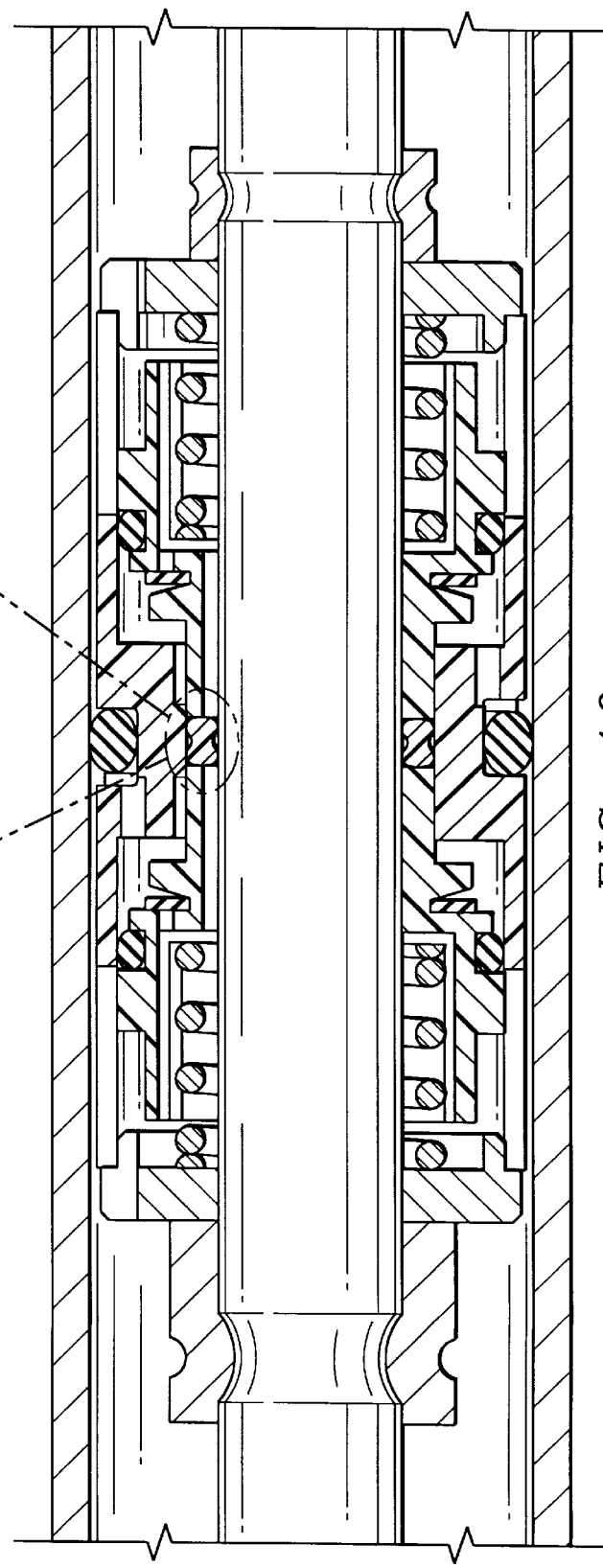
FIG. 10b
FIG. 10a
FIG. 10

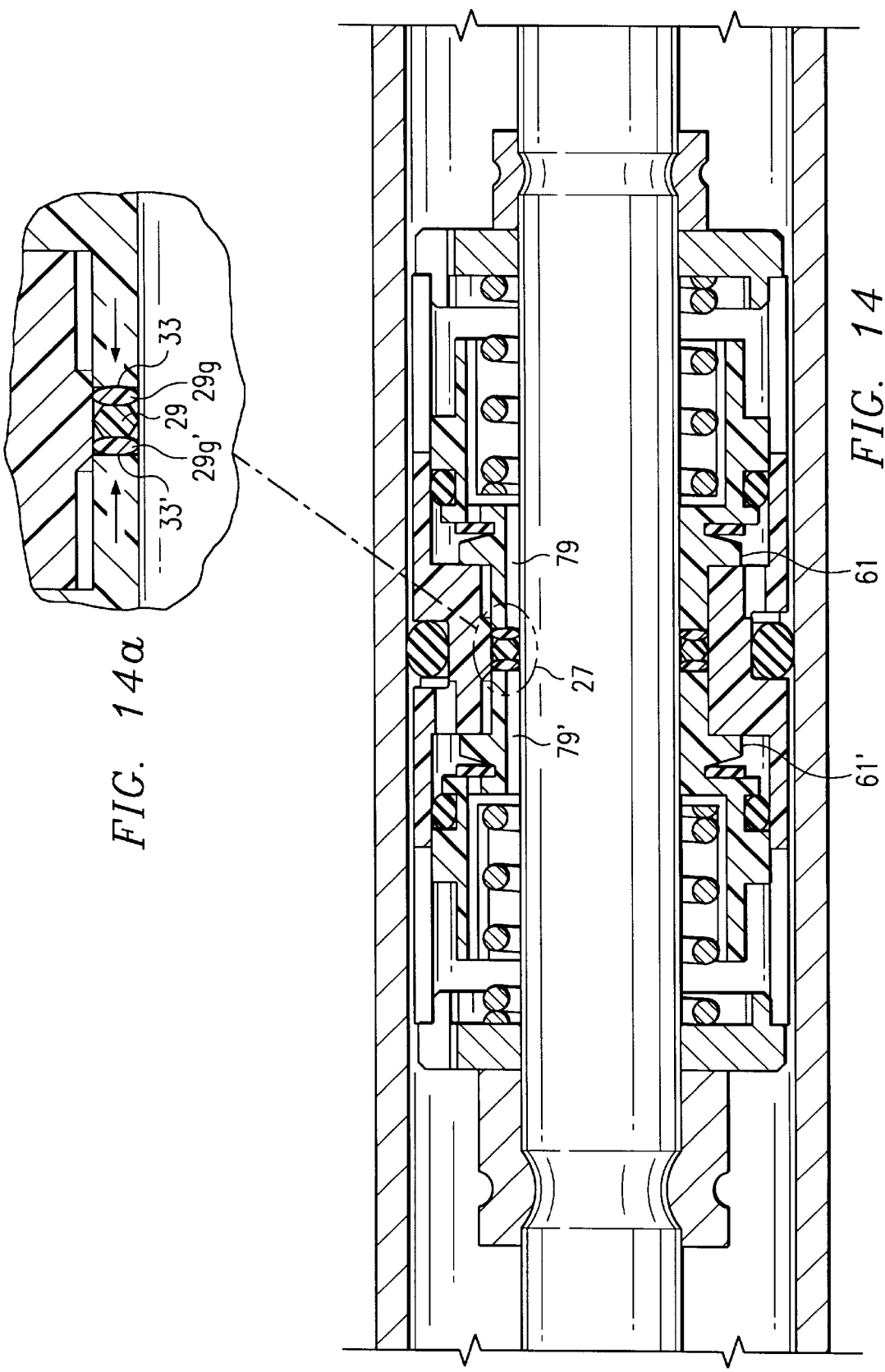

BLOCKABLE PISTON-CYLINDER UNIT

BACKGROUND

1. Field of the Invention

The present invention concerns a bidirectionally blockable piston-cylinder unit which includes a throttle arrangement to control fluid flow therethrough so as to minimize noise upon switching between opened and closed positions.

2. The Prior Art

A positional piston-cylinder unit to lock movable objects in relative positions to each other is known from DE 4,326,968 A1. Such positional locks are used, among others, in the case of vehicle doors or lids, which on the one hand, should be easily manipulated, but, on the other hand, should also safely carry the respective load. One of the advantages of a piston-cylinder lock according to DE 4,326,968 A1 is that it is possible to make the retaining function independent of the stroke. Other types of units allow the retaining function to occur only within a specific opening range of the vehicle door or lid, or else only in predetermined fixed resting steps.

One of the problems of a unit capable of being blocked in infinite steps is the noticeable switching noise. This type of noise did not occur in the case of earlier, defined blocking position types of piston-cylinder units, and is detrimental to comfort.

SUMMARY OF THE INVENTION

The object of the present invention is to further develop a piston-cylinder unit in a manner such that the noise problems known from prior art units are solved. Furthermore, the actuating force should be as constant as possible.

According to the invention, the foregoing objects are achieved by the provision of a throttle arrangement between two individual closing valves, which throttle arrangement produces a reduction in pressure between the valve outflow side of the first closing valve towards the valve inflow side of the following, second closing valve. The effect of the throttle arrangement decreases with the increasing degree of opening of the first closing valve, and to the same extent the pressurization of the second closing valve increases on the valve inflow side. The purpose is to produce a controlled coordination of the dynamic pressure between the individual valves, so that there will occur no pressure peaks which might lead to drastic motions of the valve, which motions in turn will be unpleasantly audible as noise.

In a further embodiment, the first closing valve includes a valve-closing body which abuts in the opening direction against a retaining surface of a slide, which slide in turn is operationally connected with a second valve-closing body in a manner such that an opening motion of the first valve-closing body is transferred to the second valve-closing body. In practice, the closing valves are also mechanically arranged in order, inasmuch as they all open in the same direction. Consequently, a somewhat extended sealing range can be provided for the second closing valve, so that the operating behavior of the entire valve arrangement will be less sensitive to tolerances in length.

One thus achieves the advantageous possibility of connecting a throttle arrangement after the outflow side of the second closing valve. There occurs a controlled pressure drop minimizing possible noise, since once again there is no sudden opening of the second closing valve with a 0/1 characteristic.

In a preferred embodiment, the first valve-closing body is made up of a valve ring arranged in a valve sleeve in an axially movable manner. The valve ring represents in its function a sliding valve. An ordinary O-ring may be used as a valve ring. Furthermore, the valve sleeve comprises the path-dependent effective throttle arrangement which is controlled by the valve-closing body. Here, the throttle arrangement is made between the first and the following closing valve by at least one groove in the valve sleeve. One can use several grooves of differing lengths, so that a continuous pressure drop can be achieved.

As concerns the universal usability of the piston-cylinder unit, the valve arrangement provides two flow-through directions and is designed so that each is blockable. For example, in the case of a vehicle whose trunk lid must always be open because of a protruding load, the bi-directional blocking function of the invention obviates the need for an additional securing measure. Here, the first closing valve is also used for both flow-through directions.

In order to limit assembly effort/expenses, the piston is designed as a tubular body in which there is arranged at least one slide. An end member is fixed to at least at one end of the tubular body so that the piston represents a previously assemblable component. The slide guided within the tubular body does not undergo any crosswise stress due to mechanical loads; consequently, a low-friction motion is possible.

It is advantageous to design the valve-closing body of the second closing valve as a radially elastic annular body which operates in conjunction with a cylindrical valve-seat surface. The valve-seating surface for the open switching position features a diameter which is different from that of the valve-seating surface for the blocked switching position. Thus, the valve-closing body is supported in an axially floating manner and is moved between the valve-seating surfaces as a function of forces acting on it.

In order to ensure an unimpeded motion of the slide, the slide is moved within the fluid connection between the first and the second closing valves, whereby the magnitude of the fluid connection changes. The fluid connection includes at least one pressure-equalizing connection which is controlled (switched) by a check valve.

Thus, the second valve-closing body forms the check valve for the fluid connection in that a flow connection between the adjacent working space and the fluid connection is controlled via the axial mobility of the valve-closing body. Consequently, no undesired suction may occur in the fluid connection.

In addition, the piston may include a piston ring which separates the two working chambers from each other. The piston ring is designed to be elastic and to be partially deformable in a crosswise direction, whereby one controls a dynamic-pressure connection between the fluid connection and the working space with the lower momentary pressure. In this manner, one can also lower in a controlled way any dynamic pressure in the fluid connection, so as not to impede the motion of the slide in the direction of entering the fluid connection.

In a preferred structural embodiment, the piston ring is guided within a piston-ring groove which includes pockets in the range of the dynamic-pressure connections, the piston ring being adapted to deform into the pockets under pressure. The piston ring is guided securely within the piston-ring groove. The pockets limit the deformation in the crosswise direction, so that sealing is achieved and fatigue of the material is minimized.

In the case of blockable piston-cylinder units, one must weigh what consequences may arise if the blockage cannot be overcome, say in the case of an accident. In the case of a vehicle trunk lid or hood, no special danger possibilities need to be considered. If, however, a lateral door is equipped with a piston-cylinder unit according to the invention, it is of particular advantage if the piston is fastened to the piston rod via at least one releasable retaining element. In the case of application of a force exceeding a normal actuating force, the retaining element may thereby be released and the blocking effect of the valve arrangement canceled. The retaining element thus represents a designated point of release.

It can be quite useful to fasten the piston to the piston rod by two such retaining elements, where one retaining element features a higher maximum retaining force than the other. Thus, one can provide that the retaining element which, in the opening direction of a door, absorbs the blocking forces of the piston is designed to be weaker than the other retaining element, so that in case of an accident, a vehicle door can be opened, albeit with significant effort.

In another advantageous embodiment, a damping arrangement acts on the stroke motion of the piston-cylinder unit, starting from a specified stroke position. No stops or similar devices, outside the unit, are required. Here, the damping effect is produced by a mechanical/hydraulical pressure stop.

In addition, it may be provided that the damping arrangement throttles the velocity of the stroke motion, that the individual valves opened during the stroke motion assume the closing position, and that thereby the piston-cylinder unit is blocked. Consequently, one achieves not only a damping effect, but also an effect exerted on the switching position of the valves without the use of expensive electronics.

In order to avoid a back snapping of the door or another arrangement, the pressure stop has a pressure-stop spring, whose maximum prestress force is smaller than the actuating force required to overcome the blocking of the valve arrangement.

In order to achieve a damping force that is as precise as possible, the pressure stop is hydraulically sealed during the damping process, by means of seals, with the exception of a damping orifice whose cross-section controls the damping effect.

In addition, the invention provides for the valve ring to be made in an axially upsettable and radially elastic manner. Because of the axial upsetting of the valve ring caused by the operating pressure, greater radial prestressing is achieved in the area of the sealing surfaces. The maximum prestressing of the sealing ring is limited by the counterforce of a spring. The frictional resistance of the valve ring counteracts the actuating force. Consequently, variations in the frictional resistance also represent variations in the actuating force. The operating pressure and the frictional resistance also operate in opposite directions, whereby a heightened operating pressure reinforces the actuating force and, on the other hand, enhances the sealing effect. The operating pressure, the frictional resistance and the sealing effect are in a direct relationship. The maximum frictional resistance is limited by the spring, inasmuch as the spring force supports the valve ring and therefore counteracts the operating pressure. By using a special sliding material such as PTFE one can achieve a reliable sealing at the inside and outside diameters of the valve ring without the use of direct radial means of prestressing.

In order to be able to design the prestressing on the valve ring in a manner more independent of the force of the closing spring, a spring element may be provided which acts on the backside of the valve ring and whose spring rate is smaller than that of the closing spring. The force of the closing spring (among other factors) determines the retaining force of the piston-cylinder unit. In so doing, one would also affect the retaining force of the piston-cylinder unit via the prestressing of the valve ring, which in some cases could be undesirable, however.

For the purpose of an especially space-saving form of construction, the spring element may take an arched shape, and thus represent a kind of Belleville disk spring. In order to prevent a volume of material being enclosed between the spring element and the retaining surface of the slide, the spring element is provided in at least one place with a breach such as a slit, so that the front side and back side of the valve ring in fluid connection with each other.

In one form of embodiment, at least two annular valve rings are arranged in series, achieving a seal by means of only one of their radially inner and outer diameters which form their annular circumference. Also, one annular surface of the valve rings at a time is pressurized with the operating pressure. In addition, the existing gap can be used to compensate in case of thermal expansion.

A further embodiment is characterized in that the valve ring features a groove running peripherally on one of its sealing surfaces. In this fashion, one creates in the valve ring regions with differing elasticity. Thus, the groove has a width in relation to the thickness of the valve ring such that at least one elastic sealing lip is created. The groove widens in the direction of the sealing lip(s). The operating pressure acts on one of the sealing lips in the inflow direction and ensures an appropriate prestressing. Furthermore, the sealing lip that is located beyond the groove is lifted in case of a sliding motion of the valve ring, and thereby prestresses the entire valve ring.

In another advantageous embodiment, it is envisaged that the valve ring is flowed at and pressurized in alternating fashion from two directions.

In order to eliminate errors in the assembly of the valve ring, the valve ring is designed in mirror-image fashion so that it may be installed without regard to flow direction.

In another embodiment, the valve ring may have an essentially concave form of surface in the direction of incoming flow, so that pressurizable surfaces are available at the valve ring in the direction of the surfaces to be sealed. Independently therefrom or in combination therewith, the retaining surface on the slide can feature at least one region which is aligned in the direction of the surfaces to be sealed by the valve ring. This surface region operates on the surface of the valve ring as if it were a pressure wedge.

Independently of the numerous cross-sectional forms of the valve ring, the valve ring may have at least one circumferential groove, such groove defining a free space which serves to compensate thermal expansion.

BRIEF DESCRIPTION OF THE DRAWINGS

The invention will be explained in greater detail with the aid of the following description of the figures, in which:

FIG. 3b is a cross-sectional view of the valve sleeve of the embodiment of FIGS. 2a and 2b taken along the lines 3b—3b of FIG. 3a;

FIG. 6 is an overall cross-sectional view of a piston-cylinder unit constructed in accordance with the invention;

FIG. 8 is a partial cross-sectional view of an embodiment of the invention including a damping arrangement in addition to the blockable valve structure;

FIG. 9 is a combined partial cross-sectional view and enlarged detail view of one embodiment of a prestressable valve ring and associated sealing surface structure in accordance with the invention; and FIGS. 10, 10a, 10b, 11, 11a, 11b, 12, 12a, and 13, 14, 14a, and 15a are views similar to FIG. 9, but showing different embodiments of the prestressable valve ring and associated sealing surface structure.

DESCRIPTION OF PREFERRED EMBODIMENTS

Figure 1:
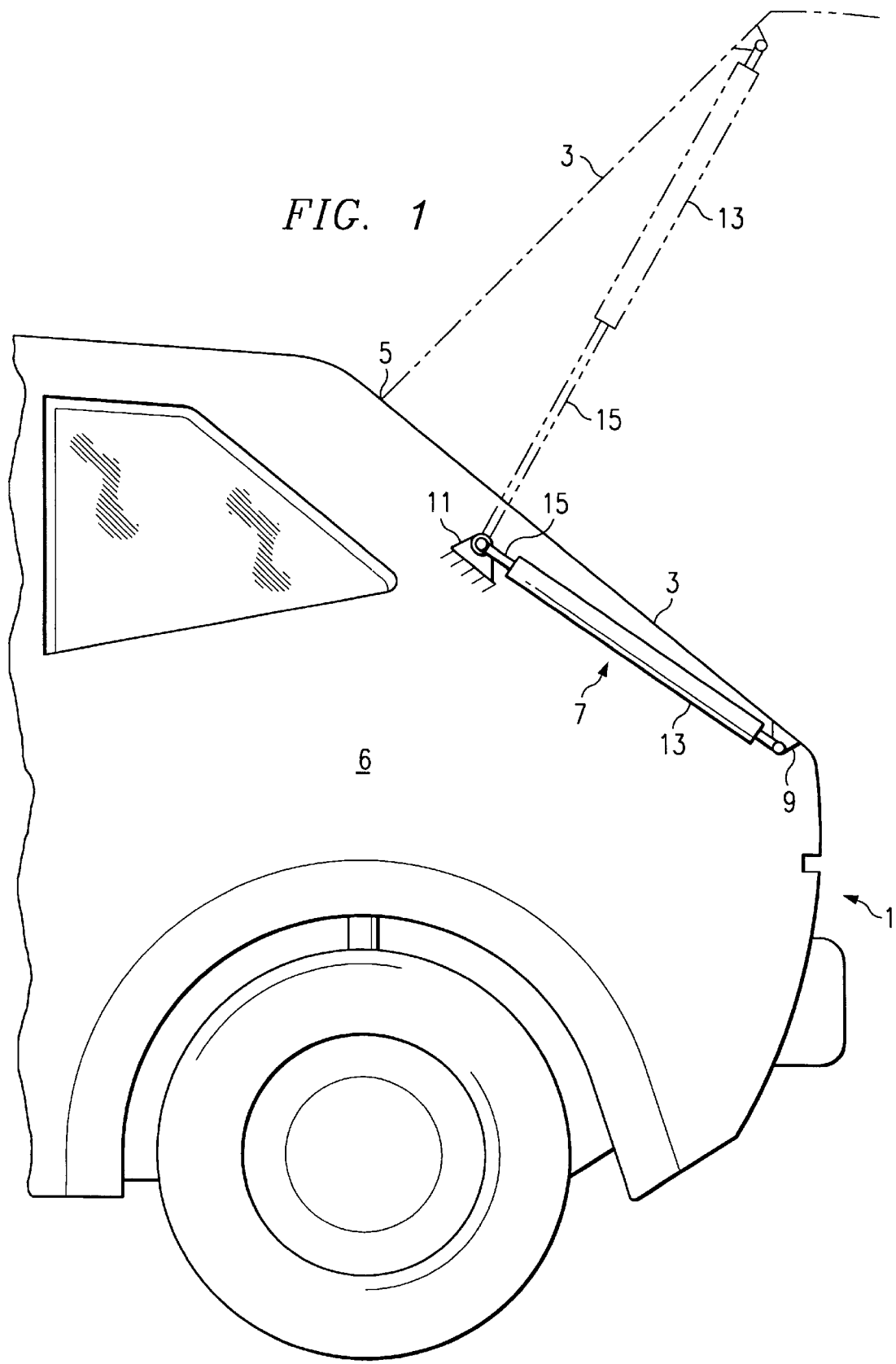
FIG. 1 is a diagrammatic view showing one application for the blockable piston-cylinder unit of the invention, namely the lifting and/or support of the trunk lid of an automobile.

FIG. 1 shows in diagrammatic fashion a motor vehicle 1 with a vehicle trunk lid 3 which is arranged in movable fashion around a pivot axis 5 which is aligned perpendicularly to the longitudinal axis of the vehicle. In order to facilitate the opening movement, a piston-cylinder unit 7 is articulated in movable fashion via connecting elements 9, 11 between the vehicle body 6 and the vehicle trunk lid 3. The piston-cylinder unit comprises a cylinder 13 and a piston rod 15 which is axially movable therein. One of the components 13, 15 engages with the vehicle body (at 11) and the other with the vehicle trunk lid (at 9), so that a motion of the vehicle trunk lid proceeds in synchronous fashion with the inward or outward motion of the piston rod 15. The use of the piston-cylinder unit 7 is not limited to vehicle trunk lids but can also be transferred to other applications, such as vehicle doors.

Figure 2A:
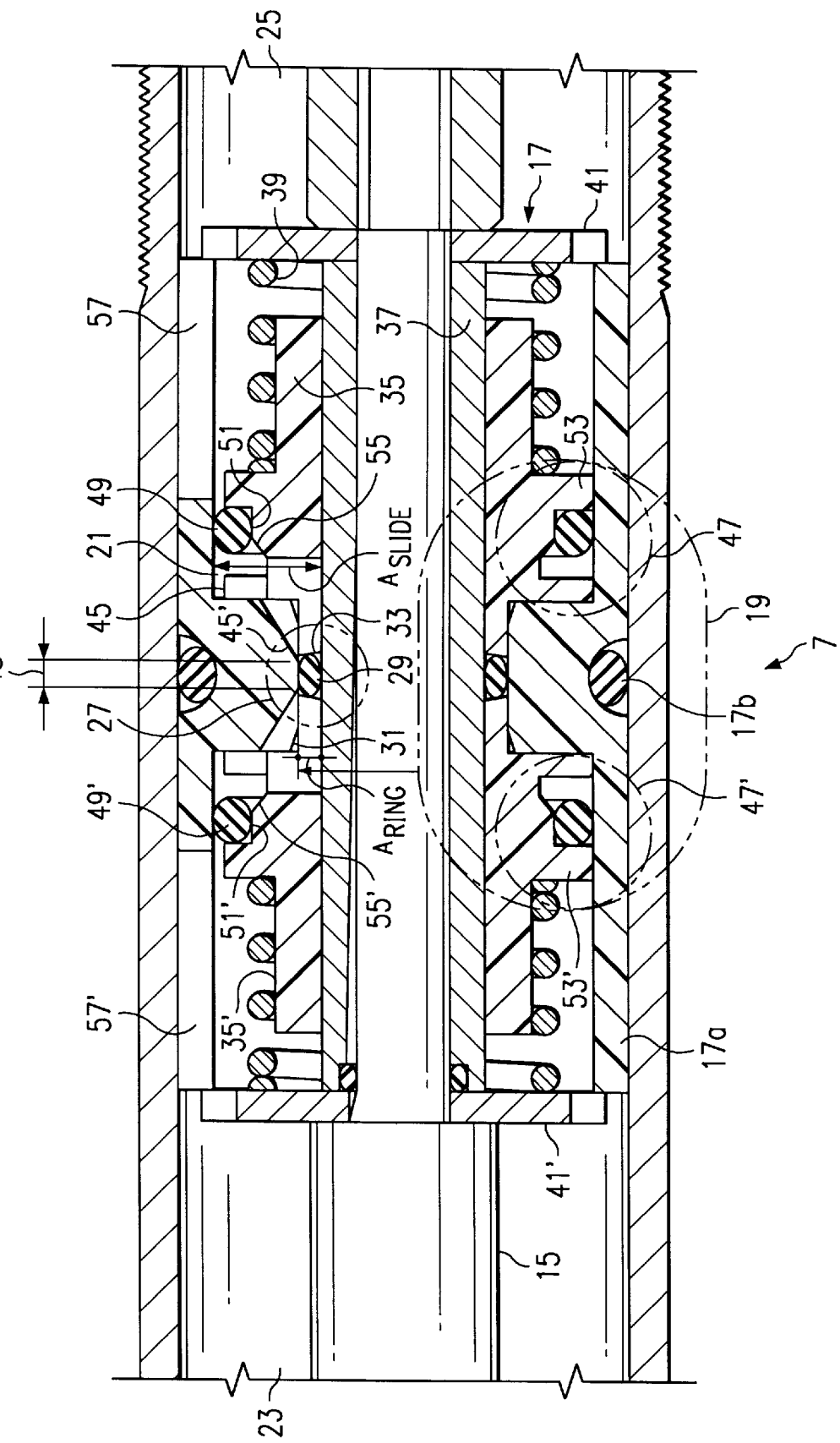
FIGS. 2a and 2b are partial cross-sectional views of one embodiment of the invention, showing the blocking valve structure in two different positions of operation.
Figure 2B:
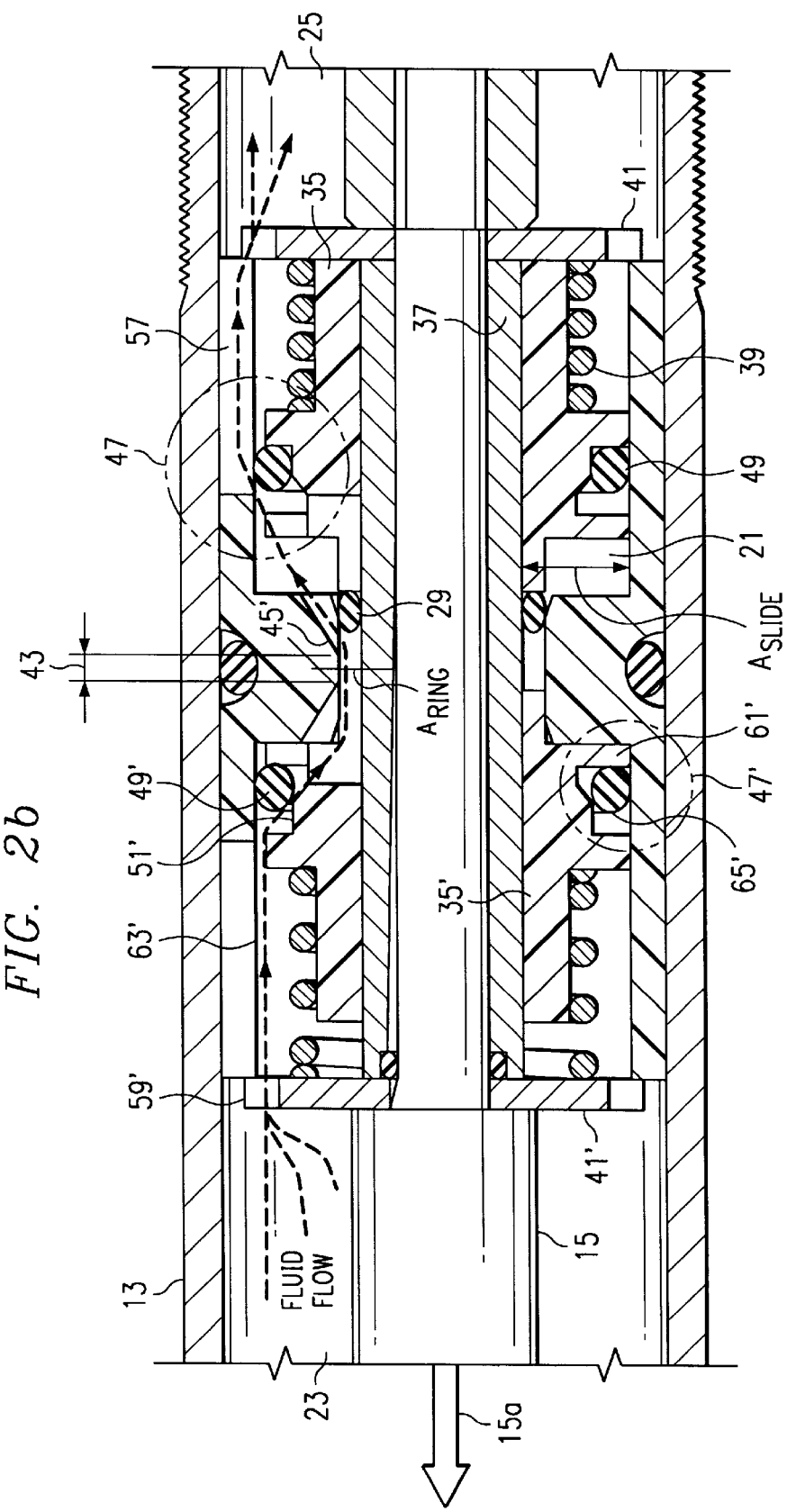

An initial example of an embodiment of the invention is shown in FIGS. 2a and 2b. The illustration is limited to that part of the piston-cylinder unit 7 that shows a piston 17 on the piston rod 15.

The piston 17 constitutes a housing for a valve arrangement 19 which allows the infinite-step hydraulic blocking of the piston-cylinder unit 7, in that a fluid connection 21 between the working chambers 23, 25 (which are separated by the piston with the piston ring 17b) can be switched at will. For that purpose, the valve arrangement 19 includes a first closing valve 27 featuring a valve-closing body 29 which comprises a valve ring and is supported in axially movable fashion within a valve sleeve 31 which makes up one of the sections of the piston. In that case, the valve-closing body 29 abuts against a retaining surface 33 of a slide 35. The slide 35 is arranged in axially movable fashion on a guide sleeve 37 and is prestressed axially by a closing spring 39. The closing spring 39 in turn is supported by an end member 41 which, together with the tubular body 17a of the piston, makes up the housing. As shown at the right hand and left hand sides of FIG. 2a, the valve arrangement is structured in mirror-image fashion relative to the first valve-closing body 29, i.e., it is identical on both sides of the valve-closing body 29, so that a blocking function is provided for both flow-through directions of the fluid connection 21.

Figure 3A:
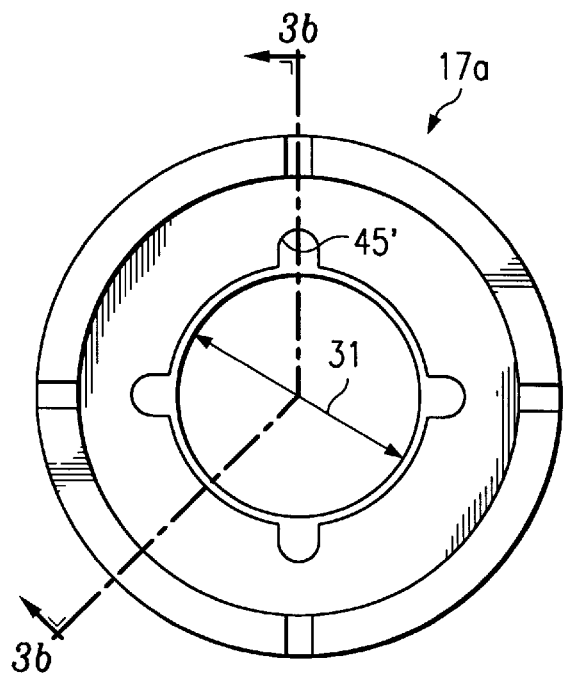
FIG. 3a is an end elevational view of the valve sleeve of the embodiment of FIGS. 2a and 2b.
Figure 3B:
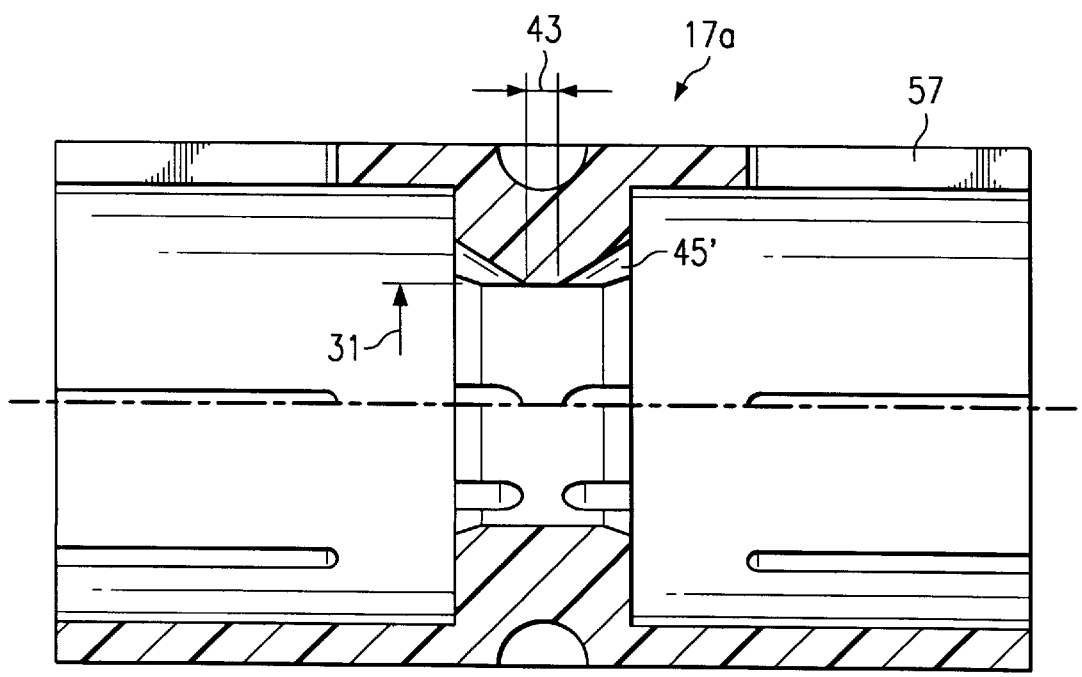

FIG. 2a shows the valve arrangement 19 in the blocking position. The valve-closing body 29 of the first closing valve 27 is located in the mid-section of the valve sleeve 31, in the sealing-surface region 43. Starting from the sealing-surface region 43, a throttle arrangement 45 follows on an outflow side of the first closing valve 27. The throttle arrangement consists of at least one, and preferably a number of grooves 45' of varying lengths, in order to release a flow-through cross-section which increases with the increase in the travel of the shifting valve-closing body 29. In FIGS. 3 and 3a, the tubular body 17a of the piston is shown as individual part and displays the grooves 45'.

The valve arrangement 19 comprises two closing valves 27, 47 or 27, 47', arranged in series (see FIGS. 2a and 2b). The second closing valve 47, 47' opens only after the first one 27 has already been switched for passage. Each second closing valve 47, 47' also possesses a valve-closing body 49, 49', which is designed as an elastic annular body that is tensioned on a cylindrical valve-seating surface 51, 51' and can be supported on one side by a flange 53, 53' of the slide 35, 35' of the second closing valve 47, 47'.

With the cylindrical valve-seating surface 51, 51' is provided an additional valve-seating surface 55, 55' of a smaller diameter, situated opposite the flange 53, 53'. The additional valve-seating surface 55, 55' is designed in conical form, so that in the case of an axial motion of the valve-closing bodies 49, 49' from the direction of flange 53, 53', no shoulders have to be overcome.

The second closing valves 47, 47' are also followed on the outflow side by a throttle arrangement consisting of slits 57, 57' in the tubular body 17a of the piston. This is to prevent the full dynamic pressure which acts upon the first closing valve 27 from streaming unimpeded over the second closing valve 47, 47' and to cause noise.

For reasons of operating comfort, a stepwise valve-releasing force is to be used in valve arrangement 19. For that purpose, pressurized surfaces of varying size are provided on the two closing valves 27 and 47, 47'. In the case of the first closing valve 27, the pressurized surface is to be made equal to the area of the valve ring 29 (hereinafter called $A_{Ring}$). The second closing valve 47, 47' possesses a significantly greater pressurized surface, which results from the circular annulus of slide 35, 35' with the valve-closing body 49, 49' (hereinafter called $A_{Slide}$). The surface $A_{Slide}$ is clearly larger, so that in the case of the second closing valve 47, 47', the effective forces keeping the valve open are several times the actuating forces in the case of the first closing valve 27. The actuating forces need only be applied for a short moment, after which comfortable utilization is ensured.

In FIG. 2b, one assumes a motion of the piston rod 15 in the direction of the arrow 15a towards the left. The pressure level in the left-hand working space 23 will necessarily rise. By means of openings 59' in the left-hand end member 41' of the piston, the fluid medium—as a rule, oil—can flow from the working space 23 into the piston, thus acting in the closing direction on the slide 35' of the left-hand second closing valve 47'. A stop 61' limits the inward travel of the slide 35' in the piston. On the side facing the valve ring 49', the slide 35' possesses flow recesses 63' which let the medium reach the valve ring. The pressures pushes the valve ring away from the valve-seating surface 51', freeing a gap 65' which lets the medium hit the first valve-closing body 29. A dynamic pressure builds up on the surface area $A_{ring}$ of the valve body 29, which moves the slide 35 together with the valve-closing body 29 in the direction of working space 25, against the force of the closing spring 39. As soon as the first valve-closing body 29 leaves its initial position, medium can flow into the fluid connection 21 via the throttle arrangement formed by the grooves 45' of varying lengths. As a consequence, a noticeable pressure differential is built up, so that the second valve-closing body 49 is pressurized with a lower dynamic pressure.

The dynamic pressure on the surface $A_{Slide}$ within the fluid connection 21 moves the slide 35 further to the right, until the second valve-closing body 49 reaches the region of the additional throttle arrangement, formed by slits 57. Because of the large surface $A_{Slide}$, even a small dynamic pressure suffices to keep the slide open during a piston-rod motion, so that the actuating force on the trunk lid is low.

As soon as the piston rod 15 comes to rest relative to cylinder 13, there is no dynamic pressure applied to the first 27 and the second 47 closing valves. There occurs a pressure equalization which, based on the elastic force of closing spring 39, lets the slide 35 of the second closing valve 47 move back into its initial position. With the motion of the slide 35 in the direction of the sealing-surface region 43 of the first closing valve 27, the first valve-closing body 29 is shifted from the retaining surface 33 of the slide 35 into the sealing-surface region 43, so that the first closing valve 27 assumes its blocking position. In this fashion, the entire valve arrangement 19 is blocked.

In the case of a piston-rod motion in the opposite direction, in which working space 25 is decreased, the inflow into piston 17 occurs precisely as described earlier, but in the opposite direction. The valve ring 29 sits in the sealing-surface region 43 and functions as a first valve-closing body for this flow-through direction, too. In a departure, however, in the left-hand second closing valve 47', the previously described gap 65' still exists, because of the reverse inflow direction from working space 23. However, even with little flow-through in the first closing valve 27, the gap 65' is closed by the valve-closing body 49' of the second closing valve 47' and the second valve-closing body 49' is shifted onto the valve-seating surface 51'.

Figure 4A:
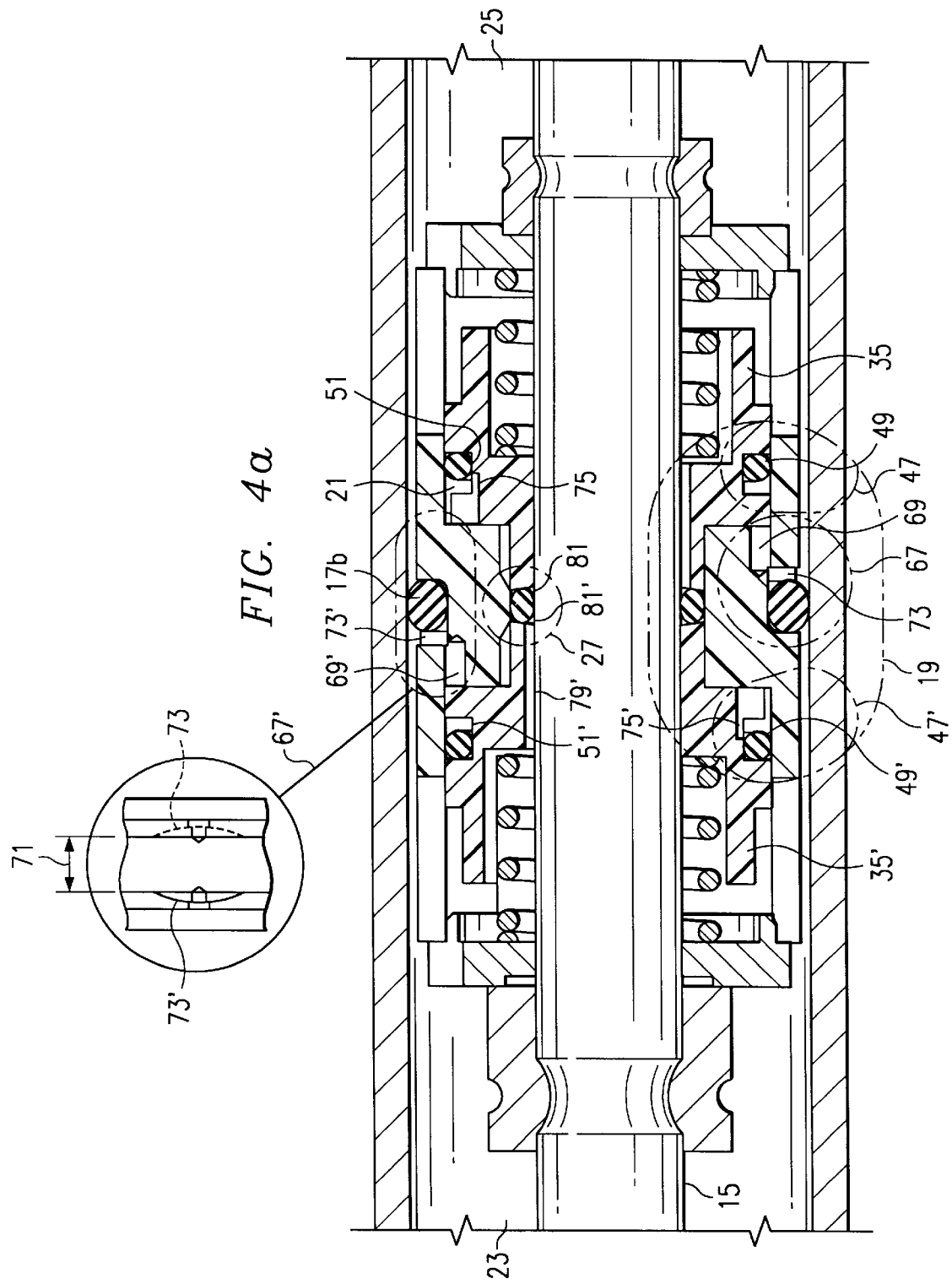
FIGS. 4a and 4b are partial cross-sectional views of another embodiment of the invention, showing the blocking valve structure in two different positions of operation.
Figure 4B:
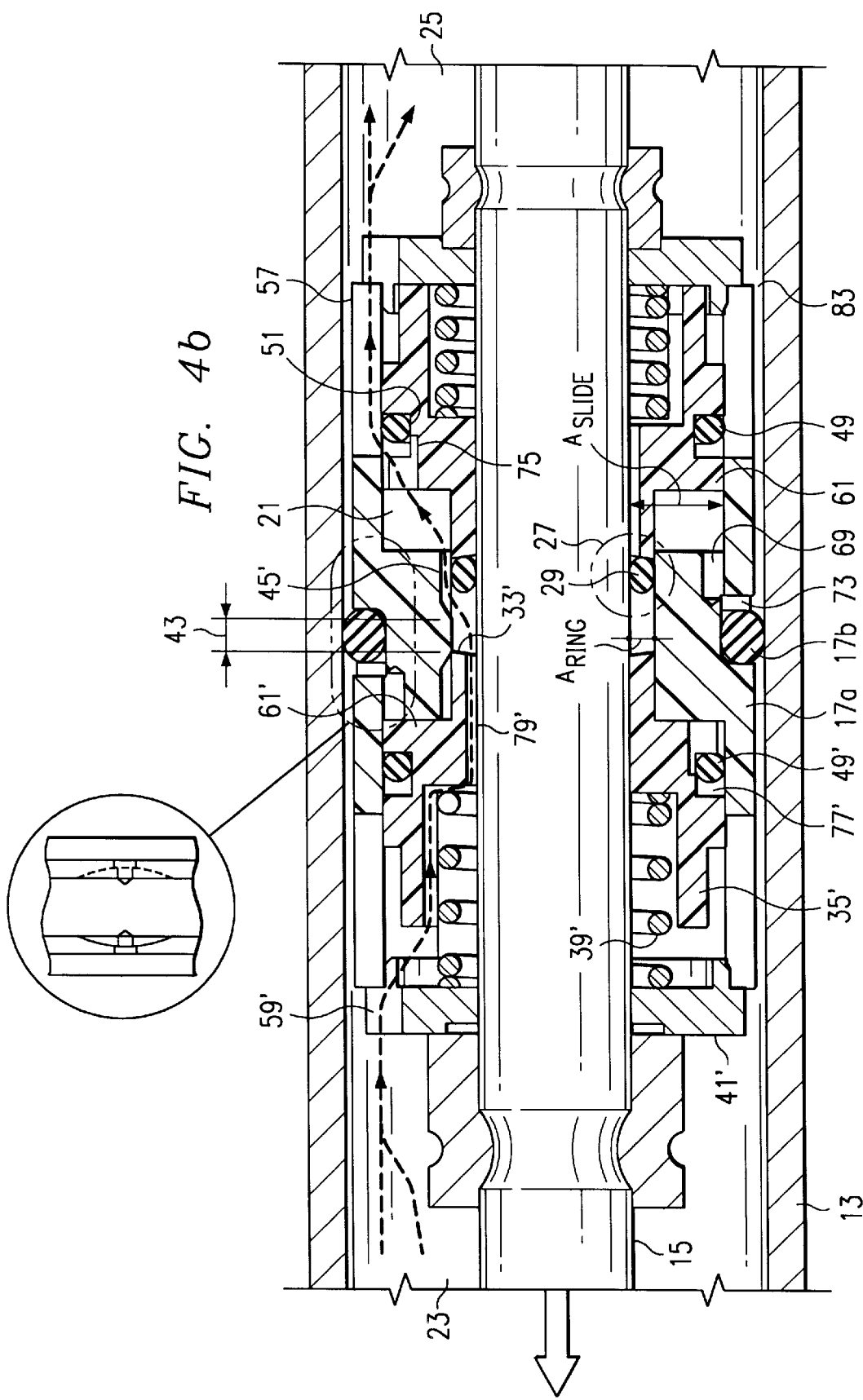

FIGS. 4a and 4b show a valve arrangement 19 which embodies the same functional principle according to FIGS. 2a and 2b. Here again, two closing valves 27 and 47, 47' are controlled sequentially, with a dynamic pressure hitting pressurizable surfaces $A_{Slide}$ and $A_{Ring}$ of different sizes.

There is a difference compared to FIG. 2a and 2b, in that the slides 35, 35' are guided directly on the outer surface of piston rod 15. Furthermore, the valve-closing body 49, 49' of the respectively second closing valves possesses a single, but lengthened, valve-seating surface 51, 51', so that the valve-closing body 49, 49' is no longer subjected to deformation in the radial direction.

One of the fundamental problems with slides occurs whenever they must be pushed into a cavity or moved out of it. One must avoid production of a dynamic pressure or suction which would impede the movement of the slide. Consequently, the valve arrangement 19 includes a check valve 67, 67' which switches a pressure-equalization connection 69, 69' on or off. The check valve comprises the piston ring 17b of the piston, which hydraulically separates the two working chambers 23, 25. The piston ring 17b is guided inside a piston-ring groove 71 (see FIG. 4a), which includes pockets 73, 73' into which the pressure-equalization connections 69, 69' open. The pockets are worked into the groove 71 sidewalls, so that the piston ring 17b, which is designed to be elastic and which, if acted upon by appropriate frictional forces between the cylinder and the piston ring, can be deformed into one or more pockets, and thereby open or close one of the pressure-equalization connections 69, 69'.

A further step to prevent suction in the fluid connection 21 can be seen in the fact that the lengthened valve-seating surfaces 51, 51' of the respectively second closing valves 47, 47' include at least one channel 75, 75' so that if the valve-closing body 49, 49' comes to overlap with the channel 75, 75', there is no complete sealing effect.

FIG. 4a shows the valve arrangement 19 in the rest position. In both working chambers 23, 25, the same operating pressure prevails. The first closing valve 27 is closed, and the second closing valves 47, 47' do not allow any medium to pass. Furthermore, the piston ring 17b lies uniformly throughout in the circumferential direction within the piston-ring groove 71.

According to FIG. 4b, the piston rod 15 is moved leftward in the direction of working space 23 thus raising the pressure in said working space. The fluid medium, under pressure, flows via openings 59' in the end member 41' into the valve arrangement. Because of the effective dynamic pressure and the elastic force of the closing spring 39', the left-hand slide 35' abuts with its stop 61' against the tubular body 17a of the piston. A small leakage flow can penetrate into a valve-closing-body groove 77' and push the valve-closing body 49' against the backside of the stop 61'. However, the position of this valve-closing body 49' is of no significance with respect to this inflow direction.

With the motion of the piston rod, a frictional force between the piston ring 17b and the inside diameter of cylinder 13 becomes effective and elastically deforms the piston ring in the region of the pockets 73. In this fashion, the pressure-equalization connections 69 are closed by the piston ring.

The inflowing medium is diverted in the direction of the inside diameter of slide 35' and is guided onward in the direction of the first closing valve 27 by means of the longitudinal channels 79' (see FIG. 4b). On slide 35', the front surface 33' which is oriented towards the closing body 29 of the first closing valve 27 is designed obliquely (see FIG. 4a), so that the closing body 29 assumes a defined operating position, but on the other side there is an annular chamber 81' (see FIG. 4a) in which there can build up a dynamic pressure capable of axially shifting the valve-closing body 29 of the first closing valve 27.

In the case of a shifting motion of the first valve-closing body 27, the latter moves out of the sealing region 43 so that the medium can pass through. Grooves 45' with varying lengths, located beyond the sealing-surface region 43, form a throttle arrangement which provides for the pressure reduction. Nonetheless, a dynamic pressure builds up in the fluid connection 21. At the same time, because of the direct contact with the slide 35, the slide 35 is synchronously moved along. The valve-closing body 49 of the right-hand second closing valve 47 is under prestress towards the inside diameter of the tubular body 17a, whereby a permanent frictional connection is created. In this stage of the movement of the second closing valve 47, the valve-closing body 49 of the second closing valve, held fast by the frictional force in the region of the channel 75, is located on the valve-seating surface 51. A significant amount of medium can transfer, which once again causes a drop in pressure. In spite of the transfer of the amount of medium, a dynamic pressure can build up in the fluid connection 21. Here, the same principles concerning the pressurized surfaces $A_{Ring}$ and $A_{Slide}$ are used as previously described in connection with FIGS. 2a and 2b.

The dynamic pressure in the fluid connection 21 lets the slide of valve-closing body 49 continue to move in the direction of working space 25. At this stage of the motion, the channel 75 in the valve-seating surface 51 is no longer available, because the valve-closing body 49 of the second closing valve 47 has assumed the position as shown. However, the slide 35 is now located in the region of the slits 57 in the annular body 17a, which permit a throttled transfer of the medium. Relatively low dynamic pressures hold the slide 35 in the opened position. The stepwise drop in pressure does not let any trace of noise be generated.

As soon as the piston-rod motion ceases, pressure equalization will occur between the working chambers 23, 25. The elastic deformation of the piston ring 17b lets the ring return to its relaxed position, whereby the pressure-equalization connection(s) 69 is/are freed again. Now, there is a direct connection between the fluid connection 21, via the pressure-equalization connection 69, an inevitable gap 83 between the tubular body 17a and the cylinder 13, towards the working space 25, so that pressure equalization can occur between the fluid connection 21 and the working space 25. Consequently, the slide 35 can be reliably pushed back into its starting position by the closing spring 39.

Inasmuch as both slides 35, 35' are made identically, a blocking after a piston-rod motion in the opposite direction can be reproduced precisely with the left-hand second closing valve 47', as already described. However, one can provide different elastic forces on the respective closing springs 39 and 39' in order to adapt the necessary dynamic-pressure forces to the prevailing requirements.

FIGS. 5a and 5b once again represent a derivation from FIGS. 4a and 4b. The essential functional difference between the two variants in FIGS. 4 and 5 lies in the fact that the valve-closing body 49, 49' of the respective second closing valves 47, 47' must not or can not carry out any axial or radial motions within a circular groove 85, 85'. A replacement for the function "Prevention of Suction in Fluid Connection 21" is provided by an additional pressure-equalization fluid connection 87, 87', which is formed in the slide 35, 35'. It features a check valve in the form of a tilting disk 89, 89' which opens towards the fluid connection 21. The check valve is switched between two limiting stops on the slide by means of pressurization.

Figure 5A:
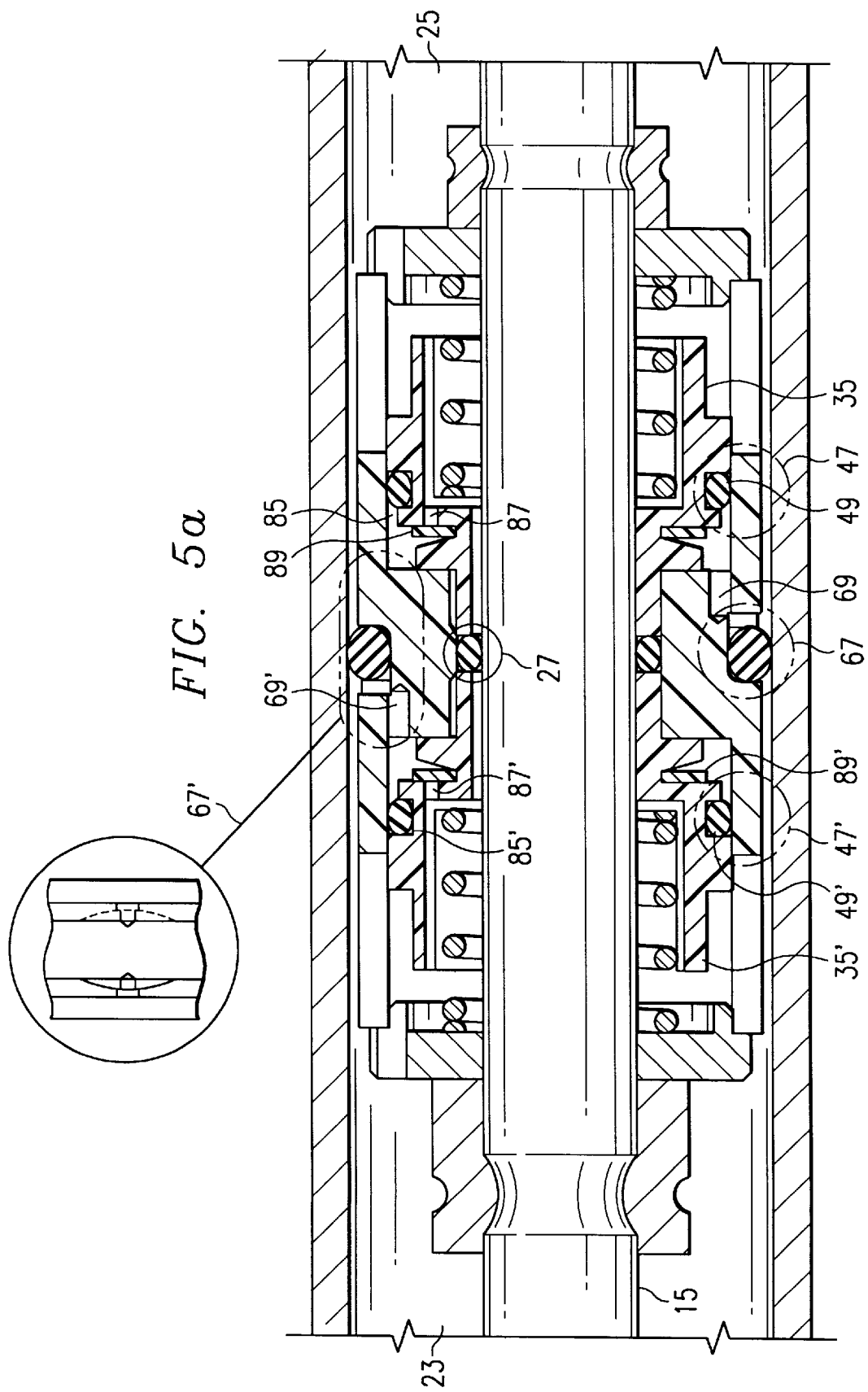
FIGS. 5a, 5b and 5c are partial cross-sectional views of a further embodiment of the invention, showing the blocking valve structure in three different positions of operation.

In the at-rest position according to FIG. 5a, the first closing valve 27 and the two second closing valves 47, 47', as well as the check valves with the tilting disk 89, 89' between the fluid connections 21 and the working chambers 23, 25, are closed. The first pressure-equalization fluid connection 69, 69' which is switched by the piston ring 17b is open.

Figure 5B:
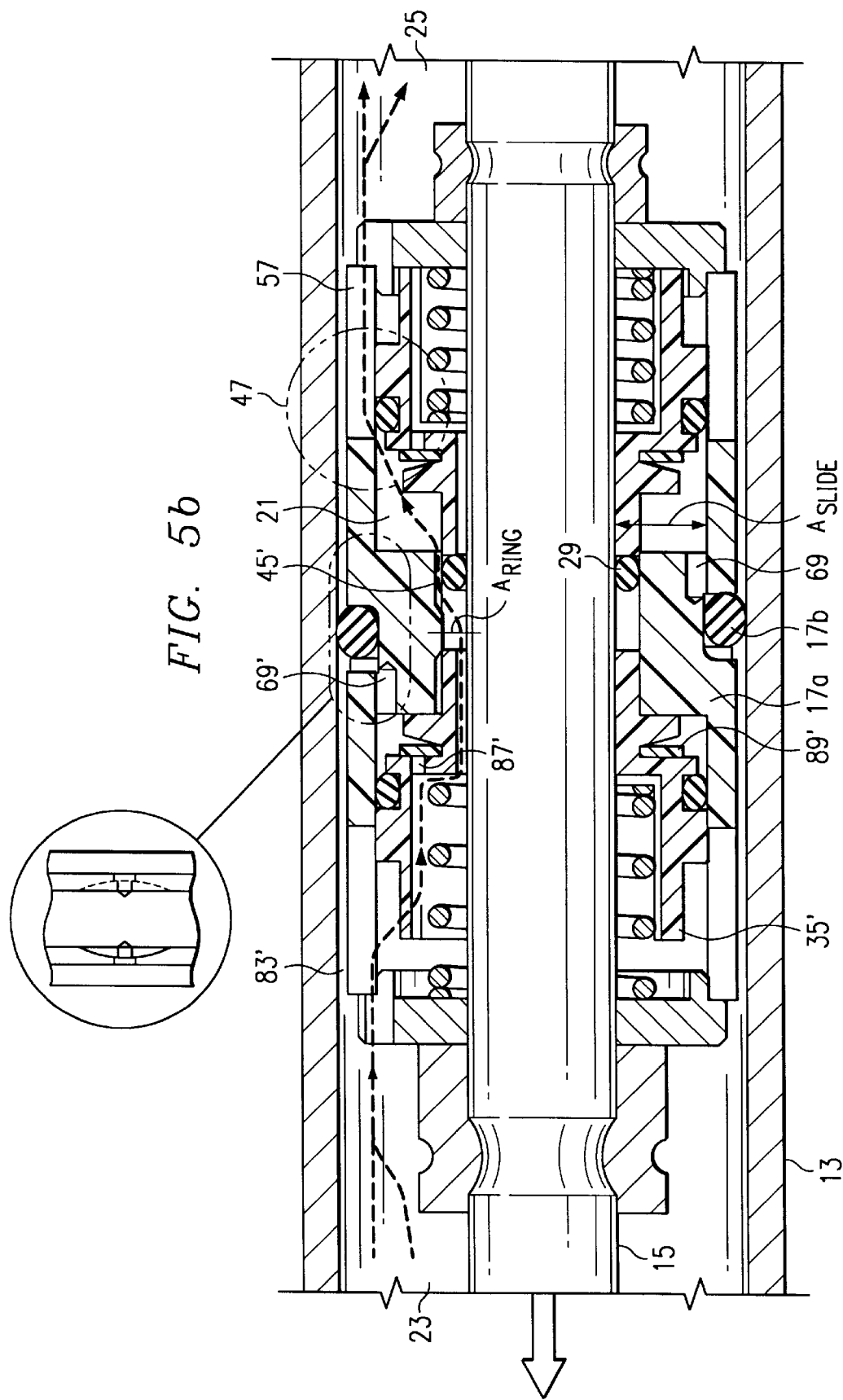

In the case of a piston-rod motion in the direction of the arrow in FIG. 5b, the fluid medium flows primarily into the bowl-shaped slide 35' and reaches the first closing valve body 29. However, at the same time a smaller part of the medium flows through the gap 83' between the tubular body 17a and the cylinder 13 to the piston ring 17b and, via the pressure-equalization connection 69', to the check valve with the tilting disk 89', for the additional pressure-equalization connection 87'. Because of the difference between the magnitudes of the pressurized surfaces on this check valve, the check valve is maintained in the closed position. It is irrelevant for the operation of the right-hand second closing valve 47, whether the check valve on the left-hand slide 35' is open or closed.

With the piston-rod motion, the pressure-equalization connections 69 via the locked position of the piston ring 17b in the pockets 73 of the piston-ring groove 71 are separated from the working space 25. If the first closing valve 27 opens, the medium that is flowing via the grooves 45' in the tubular body 17a into the fluid connection 21, can build up a second, smaller dynamic pressure on the second closing valve 47. No significant leakage loss is produced. Against the force of the closing spring 39, the dynamic pressure that is acting on the pressurized surface $A_{Slide}$ moves the slide 35, together with the valve-closing body 49, into the region of the slits 57. With this, the second closing valve 47 also opens. In this fashion, one produces an additional pressure decrease via the slits 57 designed as a throttle arrangement, so as to avoid all excessive jumps in pressure, hence the occurrence of noise.

Figure 5C:
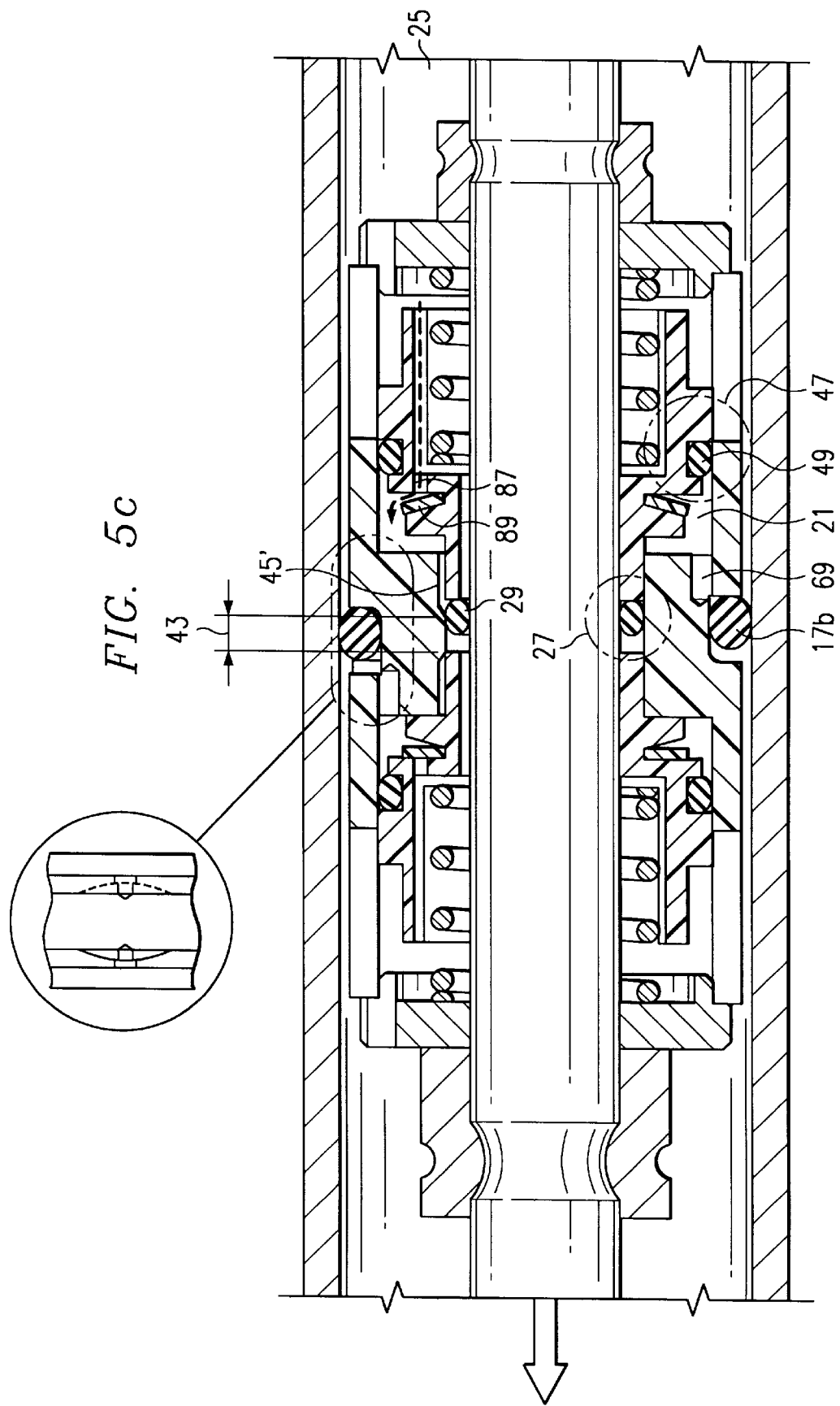

At the beginning of the opening motion of the first closing valve 27 and of the second closing valve 47, there arises a situation which can be seen in FIG. 5c. When the piston ring 17b locks the pressure-release connections 69 and the valve-closing body 29 of the first closing valve 27 has not as yet reached the grooves 45 that follow the valve-sealing region 43, a suction would develop in the fluid connection 21. This suction would work against retaining the open position of the second closing valve 47. For this reason, at this moment, the check valve 87, 89 of the second pressure-equalization connection 89 opens and permits medium flow from the working space 25 into the fluid connection 21. As soon as the first closing valve 27 permits the transfer of medium, the dynamic pressure in the fluid connection 21 again closes the check valve 87, 89.

When the piston rod is no longer moving, the dynamic pressure on the second closing valve 47 also drops, until the force of the closing spring 39 is greater than the opening force of the dynamic pressure. In this operational state, the valve arrangement behaves exactly as described in FIGS. 4a and 4b. In so doing, the check valve 87, 89 of the second pressure-release connection 89 is closed; however, the first pressure-release connection 69, with the check valve formed by the piston ring 17b, is opened, so that the slide 35 can move in controlled fashion into the fluid connection 21, until the at-rest position is reached again.

In FIG. 6, a piston-cylinder unit 7 is shown in its entirety in a sectional drawing. The valve arrangement is according to the design of FIGS. 5a through 5c. In all prior descriptions, it was always assumed that the blocking function is usable along the entire stroke length of the piston-cylinder unit. However, there are applications in which it is highly probable that in a specific region the blocking function will not be used. For that purpose, the cylinder 13 includes at least one bypass groove 91 or one diameter widening, which permits a fluid connection between the two working chambers 23, 25 independently of the operating position of the valve arrangement 19.

As already explained in connection with FIGS. 2a and 2b, the entire piston 17 with its internal components can be pre-assembled as a structural unit independently of the piston rod 13. The fastening of the piston 17 is carried out by means of annular retaining elements 93, 95, each of which is brought into the region of a bead 97, 99 on the piston rod 13. The piston 17 is aligned between the two beads 97, 99 on the piston rod. When the desired position of the piston has been assumed, the two retaining elements 93, 95 are pressed into a form-fitting connection with the respective bead 97, 99. In this fashion, the axial position of the piston 17 is fixed.

One should take into consideration that, say in the case of an accident, the blocking function of the valve arrangement 19 may not be capable of release, for reasons independent of the invention. This is why the retaining element 95 which, say, takes over the supporting function when the trunk lid must be opened, will tear off if one applies a tear-off force that is greater than the acceptable actuating force. In the present concrete example of FIG. 6, such is the case with retaining element 95 between the piston 17 and a separating piston 101.

In FIG. 6, the separating piston 101 is prestressed by a helical-coil compression spring 103. It would be very useful, however, to prestress with a gas under pressure the chamber 105 between the separating piston 101 and the closed end 107 of the piston-cylinder unit, so that an operating pressure acts on the inner end surface 104 of the piston rod, which pressure will move the piston rod in an outward direction.

Figure 7:
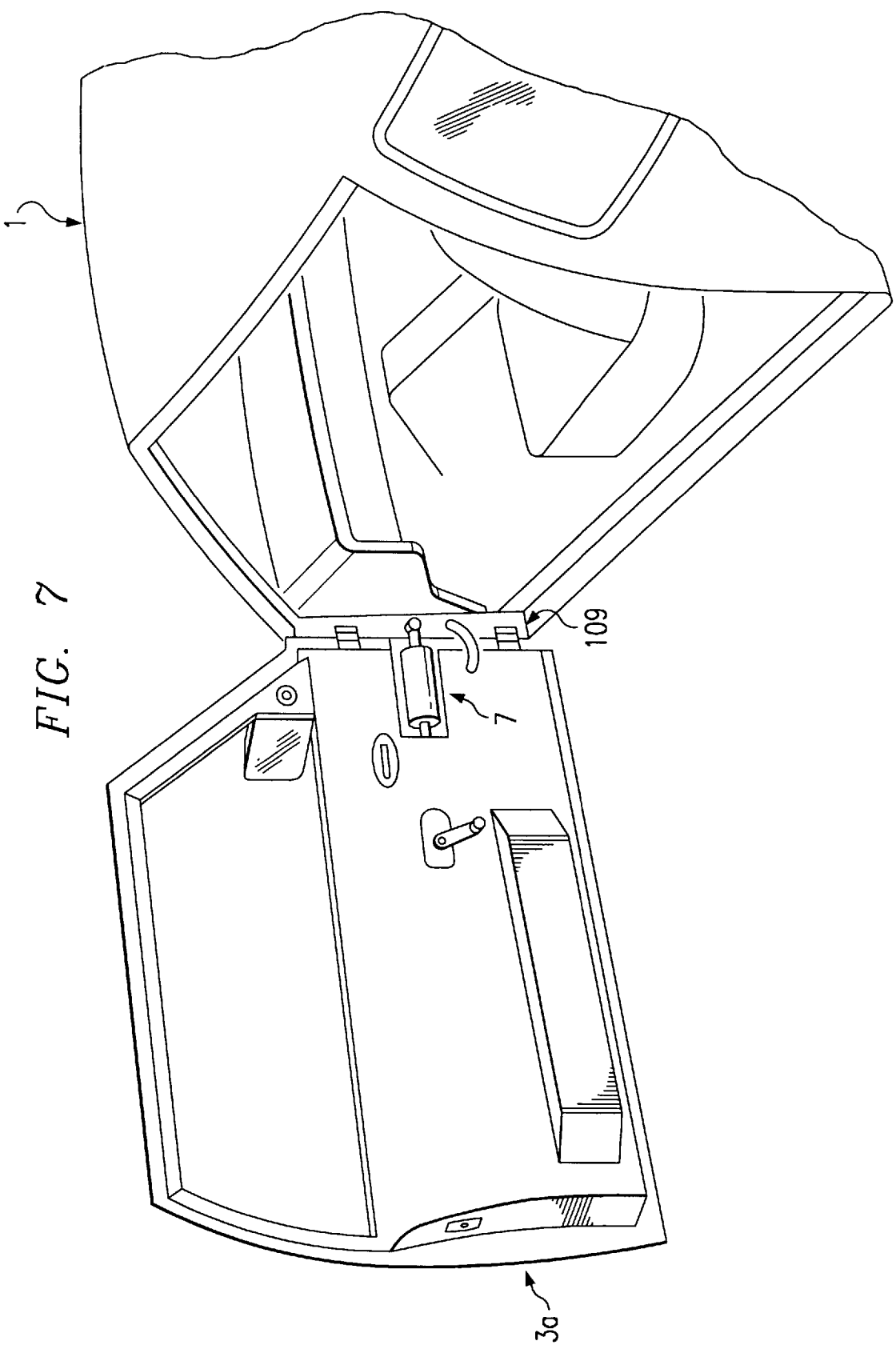
FIG. 7 shows another application for the blockable piston-cylinder unit of the invention, namely the door of an automobile.

FIG. 7 shows the built-in situation of the piston-cylinder unit 7 in the case of a lateral vehicle door 3 a which is affixed, say, to the A column of the vehicle 1. In this application, the blocking function is taken over by the piston-cylinder unit. Departing from the application according to FIG. 1, the vertically acting weight of the vehicle door is not so decisive in case of operation, because the door hinges 109 take over the support of the door. The effect on the opening forces is that the door can assume a relatively high velocity of motion, if it is sufficiently swung, since only the frictional forces in the bearing and the force of inertia of the vehicle door must be overcome. In the closing direction, the mechanical loads are not so important, since hinges 109 and a lock on the B column (not shown) can absorb the forces.

In the opening direction, the situation is entirely different. Only the hinges 109 hold door 3a and must absorb the forces. In this case, not only the weights act downward, but—much more important for the load on the hinges 109 and in particular for their connection points to the body—are the inertial forces of the vehicle door. The simplest way of safely absorbing these inertial forces consists in clearly strengthening the vehicle body 1 at the connecting points. However, this would lead to an increase in weight, while the structural space available for such a solution is scarce.

FIG. 8 shows a piston-cylinder unit 7 according to FIG. 6, with a piston according to FIGS. 5a through 5c, where the design variant can also be the same as the others described. In FIG. 8, the piston-cylinder unit 7 possesses a mechanical/hydraulic pressure stop 111 which includes a stop sleeve 113 that is axially supported by a piston-rod guide unit 117, via a pressure-stop spring 115.

The stop sleeve 113 includes a circumferential flange 119 in which is inlaid a sealing ring 121 which seals a gap between the stop sleeve 113 and the cylinder 13. The radially inner wall of the stop sleeve is made stepwise, so that a shoulder surface 123 comes into contact with a front surface 125 of the retaining element 93 as of the point of intervention of the pressure stop 111.

The diameter of the step from the inlet side (adjacent the piston 17) of the stop sleeve 113 until the shoulder surface 123 is designed in proportion to the outer diameter of the retaining element 93 in a manner such that no significant throttling effect can occur. The actual throttling effect is taken over by a radial damping orifice 127 in the stop sleeve 113. This damping orifice 127 connects the backside of the stop sleeve with the inflow side facing the piston 17.

The illustration of FIG. 8 is compressed in relation to the structural length of the piston-cylinder unit. Naturally, the pressure stop 111 is not connected directly to the bypass groove 91. The distance between the bypass groove 91 and the point of intervention of the pressure stop must be adjusted to the respective application.

In the case of a piston-rod motion in which the working space 23 decreases, from a specific stroke position onward the retaining element 93 moves into the stepped inner wall of the stop sleeve 113 with a velocity that is almost constant. The medium contained in working space 23—as already explained, generally a hydraulic fluid—can flow through the opened valves 27, 47 of the piston. As soon as the front surface 125 of the retaining element 93 abuts against the shoulder surface 123, a damping force builds up because of the damping orifice 127, reducing the velocity of the piston. The front surface 125 and the shoulder surface 123 then constitute an at least dynamically effective seal. The damping effect is thus purposely determined exclusively by the cross-section of the damping orifice 127.

Fluid can continue to flow into the piston, since at the point of intervention of the pressure stop 111, there still is a distance between the end member 41' and the stop sleeve 113.

With the reduction in the motion velocity of the piston, there also occurs a reduction in the flow velocity of the fluid through the piston, hence of the dynamic pressures on the valves 27, 47. If the dynamic pressures are below a threshold value, the valves 27, 47 move into the blocking position (see FIG. 5a). Necessarily, the piston, the piston rod, and therefore also the vehicle door will cease their motion. The entire process does not occur abruptly but, because of the damping effect of the damping orifice 127, in a manner so continuous that the influx of force into the vehicle body assumes a safely controllable level. The valves 27, 47', which are in the blocking position, also prevent the vehicle door from snapping back. In this connection, it should be noted that the elastic force of the pressure-stop spring 115 is sufficiently small that the pressure stop 111 can be moved back into its starting position, against the frictional forces between the seal 121 and the cylinder 13, but cannot exert any significant force on the piston rod.

In the examples of embodiment described below, various valve rings 29 are described. So far as concerns the overall function of the valve arrangement, please refer to the description of the figures from FIGS. 5a through 5c.

In FIG. 9, the valve-closing body or valve ring 29 is clamped between the two slides 35, 35' and the closing springs 39, 39' whose forces act on these slides. The stops 61, 61' are not active in the closed valve position, so that the prestressing of the valve ring depends solely on the spring forces of the closing springs 39, 39'. The valve ring 29 consists of an upsettable, radially elastic material with a relatively low friction coefficient. With the increasing pressurization caused by the inflow of medium via the longitudinal channels 79, 79', the valve ring is upset, whereby the pressure rise occurs very quickly, and thus the radial expansion moves along. The upsettability of the valve ring 29 should be expressed as a spring rate which operates sequentially to the spring rate of the respective closing spring 39, 39'. By means of a careful adjustment of the upsettability of the valve ring 29 in relation to the spring rate of the closing spring 39, 39', one can ensure that only a small motion in the opening direction of the valve ring 29 will occur before the maximum radial expansion—hence maximum force normal to the sealing surfaces—occurs. However, in a case of already occurring motion, there is sliding friction, so that the frictional effect—which a user of the piston-cylinder unit would perceive as uncomfortable—remains at a low level.

The valve ring 29 is designed in a mirror-image fashion and hence can be assembled in a mixup-proof manner.

FIGS. 10, 10a and 10b show further cross-sectional embodiments of the valve ring 29, which include at least one groove 29a designed to compensate for thermal expansion of the valve ring. Furthermore, by using the grooves 29a, one achieves a substantially linear contact between the valve ring 29 and the sealing-surface region 43.

Figure 11B:
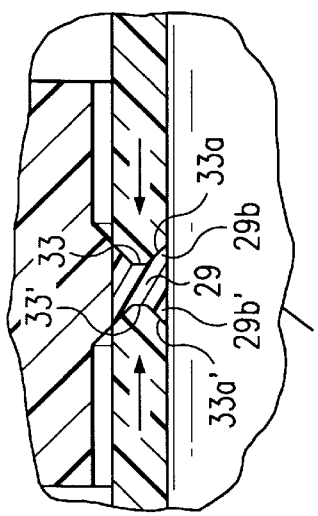
Figure 11A:
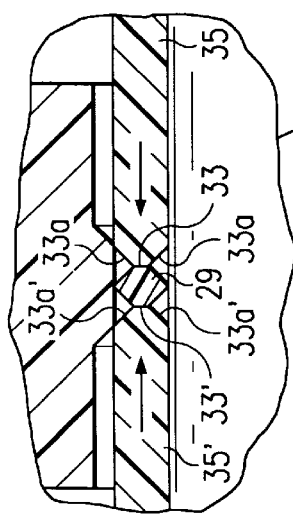
Figure 11:
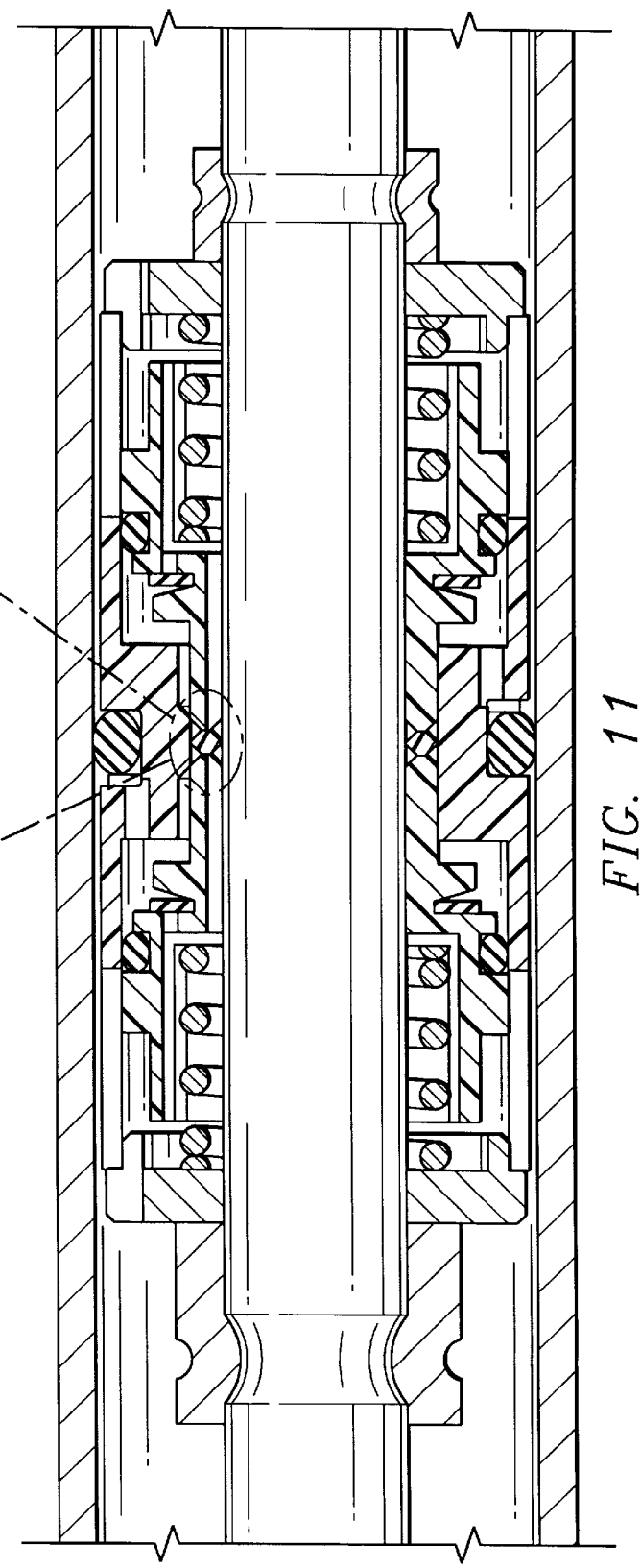

In the variant according to FIGS. 11 and 11a, the retaining surfaces 33, 33' of the slides 35, 35' are equipped with a surface region 33a, 33a' which is to be sealed in the direction of the valve ring 29. These surface regions 33a, 33a' operate on the valve ring 29 as compression wedges and reinforce the radial deformation of the valve ring 29.

FIGS. 11 and 11b shows a variant in which this effect is increased still more. In the valve ring's relaxed built-in position in the region of the pressurized surfaces, it is endowed with a concave surface form. The retaining surfaces 33, 33' have corresponding counter-contours. On one side of the valve ring 29, the pressure acts on the concave surface form and prestresses more strongly the sealing lips 29b, 29b' which are produced thereby. On the side of the valve ring 29 abutting against one of the slides 35, 35', the retaining surfaces 33, 33', with their aligned surface regions 33a, 33a', also act as compression wedges.

Figure 13:
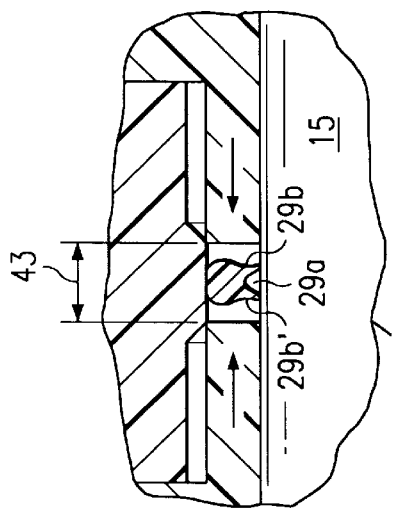
Figure 12A:
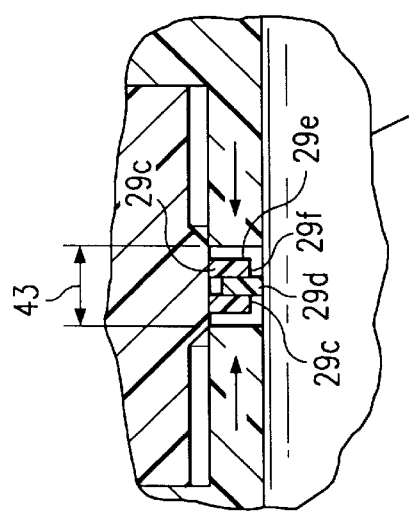
Figure 12:
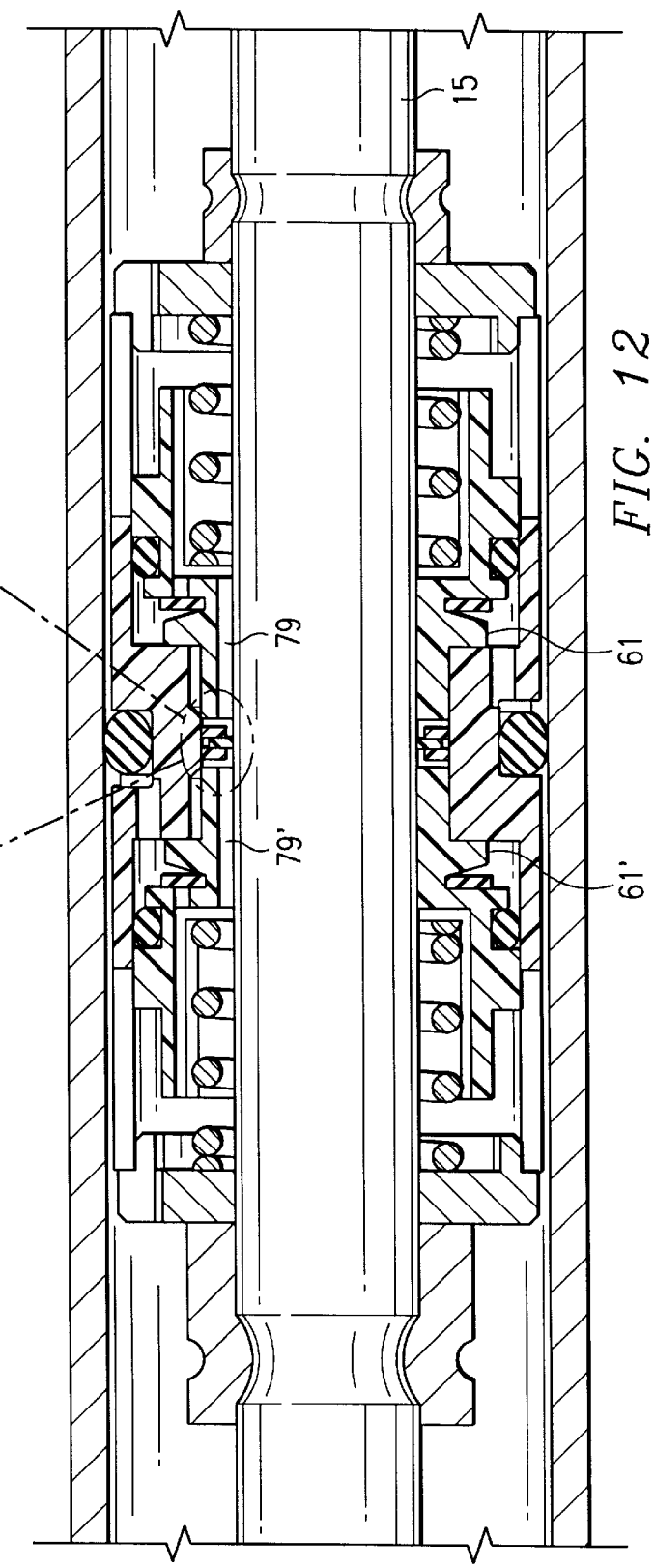

In FIGS. 12, 12a and 13, one uses a valve arrangement in which the stops 61, 61' determine the closed slide position. The valve ring 29 is axially shiftable to a small extent in the sealing-surface region 43 when the valve is closed.

The design according to FIG. 12a includes at least two individual valve bodies 29c, 29d, which lie in sealing fashion either against the inside diameter or against the outside diameter of the radially adjacent members. As soon as medium hits one of the individual valve bodies 29c, 29d via the longitudinal channels 79, 79', the entire package is shifted in the direction of the respective retaining surface 33, 33' of the slide 35, 35'. In so doing, the operating pressure acts upon the annular surface 29e and the inside diameter 29f of the individual valve-body 29c, so that these individual valve bodies 29c are axially and radially upset or prestressed. Actually, one valve-body package with one individual valve-body 29c and 29d respectively would suffice; however, one has to admit the possibility that the basic prestressings of the two individual valve bodies might differ from one another, and that in case of an incoming flow, an axial gap would occur between the two individual valve bodies.

The form of embodiment according to FIG. 13 shows a valve ring 29 with a deeper groove 29a, compared to the design according to FIGS. 10a and 10b. The valve ring is undersized with respect to piston rod 15, so that there exist sealing lips 29b, 29b' in connection with the groove 29a. For instance, in the case of an incoming flow onto the valve ring 29 from the direction of the longitudinal channel 79', the sealing lip 29b' is prestressed more strongly in a radially inward direction. At the same time, the axially movable valve ring 29 is shifted to the right. The frictional force between the sealing lip 29b and the piston rod 15 erects the sealing lip in the direction of groove 29a, whereby the radial prestressing of the valve ring 29 is produced.

In FIGS. 14, 14a and 15, 15a, once again the stops 61, 61' act to determine the position of the slide with the valve in the closed position. Departing from FIGS. 12a and 13, the free space between the retaining surfaces 33, 33' is filled by spring elements 29g and 29g'. In this fashion, the axial prestressing of valve ring 29 is determined primarily by the spring rate of spring elements 29g, 29g'. The spring elements do not seal against the inside diameter nor against the outside diameter; notches (not shown) connect the front of each spring element with the back, so that under no circumstances will there occur undefined inclusions of medium.

Figure 15A:
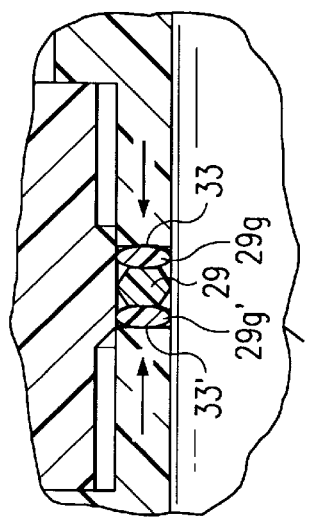
Figure 15:
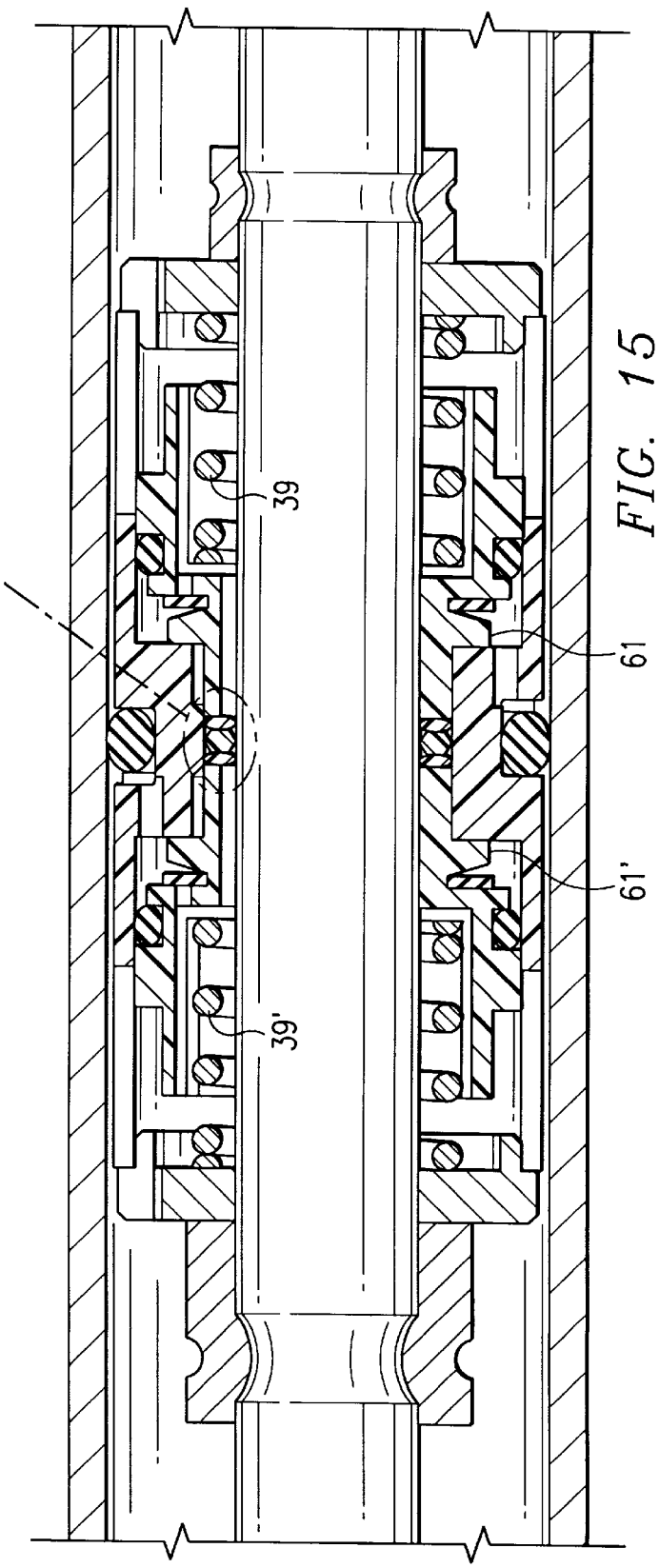

The variant according to FIGS. 15 and 15a is identical in function with that of FIGS. 14 and 14a. Departing from the latter, the spring elements 29g, 29g' have an arc-shaped spatial form; compared to FIGS. 14 and 14a, this provides a small advantage in structural space. Furthermore the spring rate can be lowered. In general, the use of a spring element only makes sense if the spring rates of the spring elements are lower than the spring rates of the closing springs 39, 39'.

What is claimed is:

1. A piston-cylinder unit comprising:
    a cylinder;
    a piston rod sealingly extending into said cylinder;
    a piston carried by said piston rod and dividing said cylinder into two working chambers;
    a working fluid in said working chambers;
    a fluid connection in said piston extending between said working chambers;
    a valve arrangement carried by said piston for blocking said fluid connection, said valve arrangement including at least first and second closing valves arranged in series and opening in sequence, each valve having a valve inflow side and a valve outflow side;
    said first closing valve includes a first valve-closing body which abuts in the opening direction against a retaining surface of a slide, which slide in turn is effectively connected with a second valve-closing body of said second closing valve so that an opening motion of the first valve-closing body is transferred to the second valve-closing body;
    a first throttle arrangement in the fluid flow path between the first and second closing valves, said first throttle arrangement producing a pressure reduction between the valve outflow side of the first closing valve towards the inflow side of the second closing valve, the effect of the first throttle arrangement decreasing as the opening of the first closing valve increases and as the pressurization of the second closing valve increases to the same extent on the valve inflow side, and
    a second throttle arrangement on the outflow side of the second closing valve.

2. A piston-cylinder unit according to claim 1, wherein the first valve-closing body comprises a valve ring which is arranged in axially movable fashion in a valve sleeve.

3. A piston-cylinder unit according to claim 2, wherein the valve sleeve includes the first throttle arrangement which is controlled by the first valve-closing body.

4. A piston-cylinder unit according to claim 2, wherein the first throttle arrangement between the first and the second closing valves comprises at least one groove in the valve sleeve.

5. A piston-cylinder unit according to claim 2, wherein the first throttle arrangement between the first and second closing valves comprises a plurality of grooves of different lengths.

6. A piston-cylinder unit according to claim 1, wherein the valve arrangement has two flow-through directions, each of which is blockable by said valve arrangement.

7. A piston-cylinder unit according to claim 1 or 6, wherein the first closing valve is used for both flow-through directions.

8. A piston-cylinder unit according to claim 1, wherein the piston comprises a tubular body in which said slide is arranged and where an end member is attached to at least one axial end of the said tubular body so that the piston comprises a pre-assemblable structural unit.

9. A piston-cylinder unit according to claim 1, wherein the valve-closing body of the second closing valve comprises a radially elastic annular body which operates in conjunction with a cylindrical valve-seating surface, said valve-seating surface having a diameter for the open switching position that is different from the diameter of the valve-seating surface for the blocked switching position.

10. A piston-cylinder unit according to claim 1, wherein the valve-closing body of the second closing valve is supported in an axially floating manner and, as a function of the forces acting on it, is moved between the valve-seating surfaces.

11. A piston-cylinder unit according to claim 1, wherein said slide is moved within the fluid connection between the first and second closing valves, said fluid connection changing in its magnitude and having a pressure-equalization connection which is switched between open and closed states by a check valve.

12. A piston-cylinder unit according to claim 11, wherein the second valve-closing body forms the check valve for the pressure-equalization connection, a flow connection between the adjacent working space and the fluid connection is controlled via the axial mobility of the second valve-closing body.

13. A piston-cylinder unit according to claim 11, wherein the check valve for the pressure-equalization connection is formed by a tilting disk, whereby a flow connection between the adjacent working space and the fluid connection is controlled via the axial mobility of the tilting disk.

14. A piston-cylinder unit according to claim 11, wherein the piston includes a piston ring which separates the two working chambers from each other, said piston ring comprising an elastic member which is partly deformable in the crosswise direction, whereby the pressure-equalization connection between the fluid connection and the working space with the lower momentary pressure is controlled.

15. A piston-cylinder unit according to claim 14, wherein the piston ring is guided in a piston ring groove which includes pockets in the region of the pressure-equalization connection, said piston ring being deformable into the pockets.

16. A piston-cylinder unit according to claim 1, wherein the piston is fastened to the piston rod by at least one retaining element, said retaining element being releasable, if a force greater than the normal operating force is applied to said piston rod, to cancel the blocking effect of the valve arrangement.

17. A piston-cylinder unit according to claim 16, wherein the piston is fastened to the piston rod by two said retaining elements, one said retaining element having a greater maximum retaining force than the other.

18. A piston-cylinder unit according to claim 1, wherein starting from a specific stroke position of the piston rod relative to the cylinder, a damping arrangement acts upon the stroke motion of the piston-cylinder unit.

19. A piston-cylinder unit according to claim 18, wherein said damping arrangement comprises a mechanical/hydraulic pressure step.

20. A piston-cylinder unit according to claim 18, wherein:
the damping arrangement throttles the velocity of the piston rod-stroke motion; and
the first and second closing valves which were opened during the stroke motion assume the closed position, thereby blocking the fluid connection extending between the two working chambers.

21. A piston-cylinder unit according to claim 19, wherein the pressure stop comprises a pressure-stop spring whose maximum prestressing force is smaller than the actuating force necessary to overcome the blocking action of the valve arrangement.

22. A piston-cylinder unit according to claim 19, wherein, with the exception of a throttling cross-section, the pressure stop is hydraulically sealed during the throttling operation.

23. A piston-cylinder unit according to claim 19, wherein the first valve-closing body comprises at least one valve ring, said valve ring being axially upsettable and radially elastic, so that due to the axial compression of the valve ring caused by the operating pressure, there is an increased radial prestress in the region of the sealing surfaces, the maximum prestress of the valve ring being limited by the counterforce of a spring.

24. A piston-cylinder unit according to claim 23, wherein a spring element is assigned to the valve ring on its backside, .the spring rate of the spring element being lower than that of a closing spring.

25. A piston-cylinder unit according to claim 24, wherein the spring element has an arc-shaped spatial form.

26. A piston-cylinder unit according to claim 23, wherein at least two annular valve rings are arranged sequentially, said valve rings seal only with one of their radially inner and outer diameters, and only one annular surface of the valve rings at a time being pressurized by the operating pressure.

27. A piston-cylinder unit according to claim 23, wherein the valve ring includes on one of its sealing surfaces a groove running in the circumferential direction.

28. A piston-cylinder unit according to claim 27, wherein said groove has a width in relation to the thickness of the valve ring so that at least one elastic sealing lip is produced.

29. A piston-cylinder unit according to claim 1, wherein said first valve-closing body comprises a valve ring which is alternatingly flowed-at and pressurized from two directions.

30. A piston-cylinder unit according to claim 1, wherein said first valve-closing body comprises a valve ring, said valve ring being made in mirror-image fashion.

31. A piston-cylinder unit according to one of claims 23 to 25 and 27 to 30, wherein the valve ring includes a substantially concave surface form in the incoming-flow direction, so that pressurizable surfaces exist on the valve ring in the direction of the surfaces to be sealed.

32. A piston-cylinder unit according to claim 23, wherein the retaining surface on each slide comprises a surface region which is aligned in the direction of the surfaces to be sealed by the valve ring.

33. A piston-cylinder unit according to one of claims 23 to 25 and 27 to 30, wherein the valve ring includes at least one circumferential groove which defines a free space which serves to compensate thermal expansion.

\* \* \* \* \*

UNITED STATES PATENT AND TRADEMARK OFFICE
CERTIFICATE OF CORRECTION

PATENT NO.   : 6,179,100 B1
DATED        : January 30, 2001
INVENTOR(S)  : Mintgen et al.

It is certified that error appears in the above-identified patent and that said Letters Patent is hereby corrected as shown below:

Title page,
Item [30], Foreign Application Priority Data, insert -- Aug. 11, 1997 (DE) ... 197 58 480 --

Column 3,
Line 24, "hydraulical" should read -- hydraulic --

Column 7,
Line 3, "$A_{ring}$" should read -- $A_{Ring}$ --

Column 13,
Line 19, "shows" should read -- show --
Line 66, "14a and 15," should read -- 14a, 15 and --

Column 14,
Line 48, "side, and" should read -- side; and --

Column 15,
Line 6, "where" should read -- wherein --
Line 8, "pre-assembable" should read -- pre-assemblable --
Line 29, "connection, a" should read -- connection, whereby a --

Column 16,
Line 3, "step." should read -- stop. --
Line 28, ".the" should read -- the --

Signed and Sealed this

Twenty-second Day of January, 2002

*Attest:*

*Attesting Officer*

JAMES E. ROGAN
*Director of the United States Patent and Trademark Office*